(12) United States Patent
Kang et al.

(10) Patent No.: US 11,671,806 B2
(45) Date of Patent: Jun. 6, 2023

(54) METHOD FOR COMMUNICATION BASED ON STATE OF EXTERNAL ELECTRONIC DEVICE AND ELECTRONIC DEVICE THEREOF

(71) Applicant: Samsung Electronics Co., Ltd., Suwon-si (KR)

(72) Inventors: Seungseok Kang, Suwon-si (KR); Seunggyu Kong, Suwon-si (KR); Hyungeun Kim, Suwon-si (KR); Jungmin Cho, Suwon-si (KR); Gajin Song, Suwon-si (KR); Sunkey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 17/169,965

(22) Filed: Feb. 8, 2021

(65) Prior Publication Data
US 2021/0250744 A1 Aug. 12, 2021

(30) Foreign Application Priority Data
Feb. 10, 2020 (KR) .................. 10-2020-0015548

(51) Int. Cl.
*H04W 4/80* (2018.01)
*H04L 67/06* (2022.01)
(Continued)

(52) U.S. Cl.
CPC ............ *H04W 4/80* (2018.02); *H04L 67/06* (2013.01); *H04W 4/23* (2018.02); *H04W 52/0235* (2013.01); *H04W 76/14* (2018.02)

(58) Field of Classification Search
CPC ..... H04W 4/80; H04W 4/23; H04W 52/0235; H04W 76/14; H04W 4/023; H04W 4/06;
(Continued)

(56) References Cited

U.S. PATENT DOCUMENTS 10,149,241 B2  12/2018 Zhang et al.
10,708,743 B2  7/2020 Park et al.
(Continued)

FOREIGN PATENT DOCUMENTS

KR  10-2012-0052549 A  5/2012
KR  10-2014-0124304 A  10/2014
KR  10-2021-0049653 A  5/2021

OTHER PUBLICATIONS

International Search Report dated Jun. 2, 2021, issued in International Patent Application No. PCT/KR2021/001603.

*Primary Examiner* — Benjamin H Elliott, IV
(74) *Attorney, Agent, or Firm* — Jefferson IP Law, LLP

(57) ABSTRACT

An electronic device is provided. The electronic device includes a first communication circuit, a second communication circuit supporting a wireless protocol different from the first communication circuit, a display, a processor operatively connected to the first communication circuit, the second communication circuit, and the display, and a memory. The processor is configured to identify at least one external electronic device by using the first communication circuit, transmit, to a first external electronic device, a state change request for causing the first external electronic device to transition to a first state if state change information indicating that the first external electronic device has transitioned from the first state to a second state is received before transmitting data to the first external electronic device.

18 Claims, 17 Drawing Sheets

(51) Int. Cl.
*H04W 52/02* (2009.01)
*H04W 76/14* (2018.01)
*H04W 4/23* (2018.01)

(58) Field of Classification Search
CPC ... H04W 12/069; H04W 76/16; H04W 88/06; H04W 76/27; Y02D 30/70; H04L 67/06; H04M 1/72484; H04M 1/72412; H04M 2201/34; H04M 2201/36; H04M 2250/02; H04M 2250/06; H04B 1/401
See application file for complete search history.

(56) References Cited

U.S. PATENT DOCUMENTS

| | | | | |
|---|---|---|---|---|
| 11,190,923 | B2* | 11/2021 | Lee | H04W 12/55 |
| 2012/0124400 | A1* | 5/2012 | Yoon | H04W 52/0209 |
| | | | | 713/310 |
| 2014/0025847 | A1* | 1/2014 | Choi | G06F 13/102 |
| | | | | 710/33 |
| 2014/0073244 | A1* | 3/2014 | Ko | H04L 69/14 |
| | | | | 455/41.1 |
| 2014/0308898 | A1* | 10/2014 | Lee | H04W 4/80 |
| | | | | 455/41.3 |
| 2015/0103708 | A1* | 4/2015 | Kang | H04W 52/0235 |
| | | | | 370/329 |
| 2015/0304800 | A1* | 10/2015 | Son | H04W 88/04 |
| | | | | 455/41.2 |
| 2016/0085495 | A1* | 3/2016 | Lee | G06F 13/385 |
| | | | | 710/14 |
| 2016/0117076 | A1* | 4/2016 | Kim | H04M 1/724 |
| | | | | 715/735 |
| 2016/0127989 | A1* | 5/2016 | Zhang | H04W 52/0235 |
| | | | | 726/7 |
| 2016/0323863 | A1* | 11/2016 | Park | H04W 4/70 |
| 2017/0026995 | A1* | 1/2017 | Huang | H04W 72/1278 |
| 2017/0086014 | A1* | 3/2017 | Hwang | H04L 67/55 |
| 2017/0094677 | A1* | 3/2017 | Liu | H04W 72/1215 |
| 2018/0041349 | A1* | 2/2018 | Jung | H04N 21/4436 |
| 2018/0199176 | A1* | 7/2018 | Srivatsa | H04M 1/72412 |
| 2018/0310232 | A1* | 10/2018 | Satyanarayana | H04W 48/20 |
| 2019/0208557 | A1* | 7/2019 | Kim | H04W 76/14 |
| 2021/0067586 | A1* | 3/2021 | Jhanji | H04W 76/14 |
| 2021/0127431 | A1* | 4/2021 | Kim | H04W 4/80 |
| 2021/0250744 | A1* | 8/2021 | Kang | H04W 76/16 |

* cited by examiner

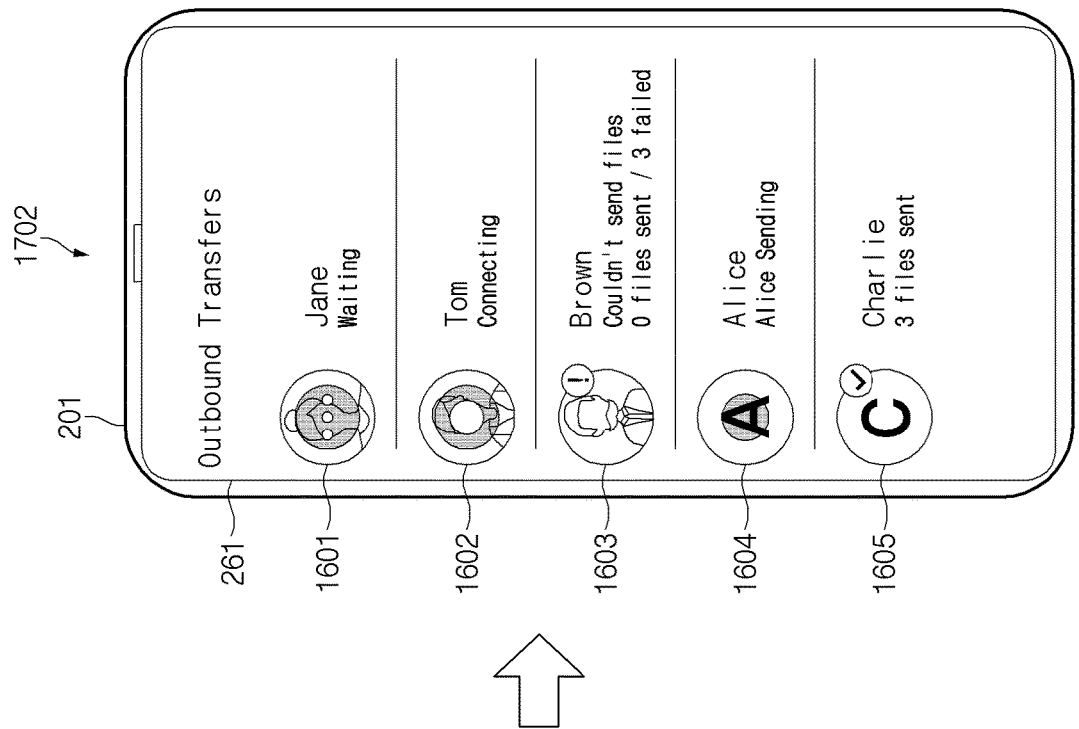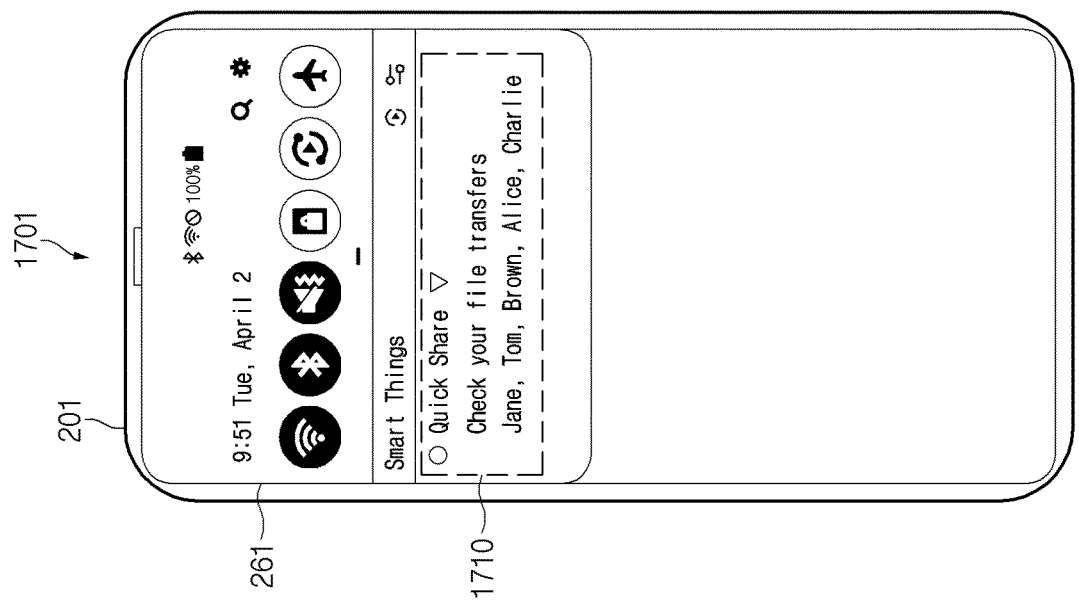
FIG. 17

METHOD FOR COMMUNICATION BASED ON STATE OF EXTERNAL ELECTRONIC DEVICE AND ELECTRONIC DEVICE THEREOF

CROSS-REFERENCE TO RELATED APPLICATION(S)

This application is based on and claims priority under 35 U.S.C. § 119(a) of a Korean patent application number 10-2020-0015548, filed on Feb. 10, 2020, in the Korean Intellectual Property Office, the disclosure of which is incorporated by reference herein in its entirety.

BACKGROUND

1. Field

The disclosure relates to a technology in which an electronic device recognizes an external electronic device and communicates based on a state of the external electronic device, in order to transmit or receive data. More particularly, the disclosure relates to the electronic device determines the state of an external electronic device and transmits data to the device by one of two communication circuits based on the determination.

2. Description of Related Art

With the supply of various electronic devices, connections and content sharing between devices are increasing. In order to transmit and receive data between devices located within a short distance, short-range wireless communication may be used. Short-range wireless communication includes a method in which devices connected to an access point communicate through the access point, and a method in which devices are directly paired to communicate with each other. As examples of the method in which devices are directly paired to communicate with each other, there are Bluetooth™, wireless fidelity (Wi-Fi) Aware, an ad-hoc method, a mobile access point, and/or a Wi-Fi Direct.

The above information is presented as background information only to assist with an understanding of the disclosure. No determination has been made, and no assertion is made, as to whether any of the above might be applicable as prior art with regard to the disclosure.

SUMMARY

In order to share data, a user may share data with other electronic devices via a server. For example, a user may share data with other electronic devices via a server (e.g., a messenger server) related to an application by using the application of the electronic device (e.g., a messenger application). When a large amount of data, such as a high-definition picture or a high-capacity video, is shared via a server, the data sharing speed may be reduced due to the limitation of the data transmission amount. When data size reduction is used to prevent a decrease in speed, the quality of data (e.g., image quality) may deteriorate.

In order to solve the problem of data sharing via the server, users may share data by using device-to-device (D2D) communication. In this case, in order to discover a nearby electronic device, the electronic device may be configured to broadcast a discovery signal or to receive a discovery signal from an external electronic device. However, even when the electronic device is in a low power state (e.g., a sleep mode), the battery of the electronic device may be consumed due to transmission and/or reception of the discovery signal. In order to reduce battery consumption, the electronic device may be configured so as not to transmit and/or receive a discovery signal in the low power state. In this case, if the electronic device transitions to a low power state while waiting for data reception, the electronic device may fail to receive data.

Aspects of the disclosure are to address at least the above-mentioned problems and/or disadvantages and to provide at least the advantages described below. Accordingly, an aspect of the disclosure is to provide an electronic device determines the state of an external electronic device and transmits data to the device by one of two communication circuits based on the determination.

Additional aspects will be set forth in part in the description which follows and, in part, will be apparent from the description, or may be learned by practice of the presented embodiments.

In accordance with an aspect of the disclosure, an electronic device is provided. The electronic device includes a first communication circuit, a second communication circuit supporting a wireless protocol different from the first communication circuit, a display, a processor operatively connected to the first communication circuit, the second communication circuit, and the display, and a memory operatively connected to the processor, in which the memory stores one or more instructions that, when executed, cause the processor to identify at least one external electronic device by using the first communication circuit, transmit, to a first external electronic device, a state change request for causing the first external electronic device to transition to a first state if state change information indicating that the first external electronic device has transitioned from the first state to a second state is received before transmitting data to the first external electronic device, the first external electronic device being among the at least one external electronic device, the second state consuming less power than the first state, and transmit the data to the first external electronic device by using the second communication circuit, after transmitting the state change request.

In accordance with another aspect of the disclosure, a method for data transmission of an electronic device is provided. The method includes identifying at least one external electronic device by using a first communication circuit of the electronic device, receiving state change information indicating that a first external electronic device has transitioned from a first state to a second state before transmitting data to the first external electronic device, the first external electronic device being among the identified at least one external electronic device, the second state consuming less power than the first state, transmitting, to the first external electronic device, a state change request for causing the first external electronic device to transition to the first state based on the state change information, and transmitting the data to the first external electronic device by using a second communication circuit of the electronic device, after transmitting the state change request, in which the second communication circuit is configured to support a wireless protocol different from the first communication circuit.

In accordance with another aspect of the disclosure, an electronic device is provided. The electronic device includes a first communication circuit, a second communication circuit supporting a wireless protocol different from the first communication circuit, a processor operatively connected to the first communication circuit and the second communication circuit, and a memory operatively connected to the processor, in which the memory stores one or more instructions that, when executed, cause the processor to broadcast information of the electronic device by using the first communication circuit, receive a connection request from an external electronic device by using the second communication circuit, transmit, to the external electronic device, a response signal for accepting the connection request by using the second communication circuit, and transmit, to the external electronic device, state change information indicating a transition to a second state by using the first communication circuit if the electronic device has transitioned from a first state to the second state before receiving data from the external electronic device, the second state consuming less power than the first state.

With an electronic device according to various embodiments disclosed in the disclosure, it is possible to prevent transmission failure by communicating with an external electronic device based on whether the external electronic device is in a low power state.

With an electronic device according to various embodiments disclosed in the disclosure, it is possible to increase user convenience by displaying only an external electronic device that is not in a low power state as a connectable electronic device.

With an electronic device according to various embodiments disclosed in the disclosure, it is possible to change the state of an external electronic device in a low power state by transmitting a signal indicating a transition to a high power state to the external electronic device. The electronic device may successfully transmit data by transmitting a signal indicating a change of the state of the external electronic device at a time point when data transmission is required.

Besides, various effects may be provided that are directly or indirectly identified through the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates a UI indicating a data sharing state according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
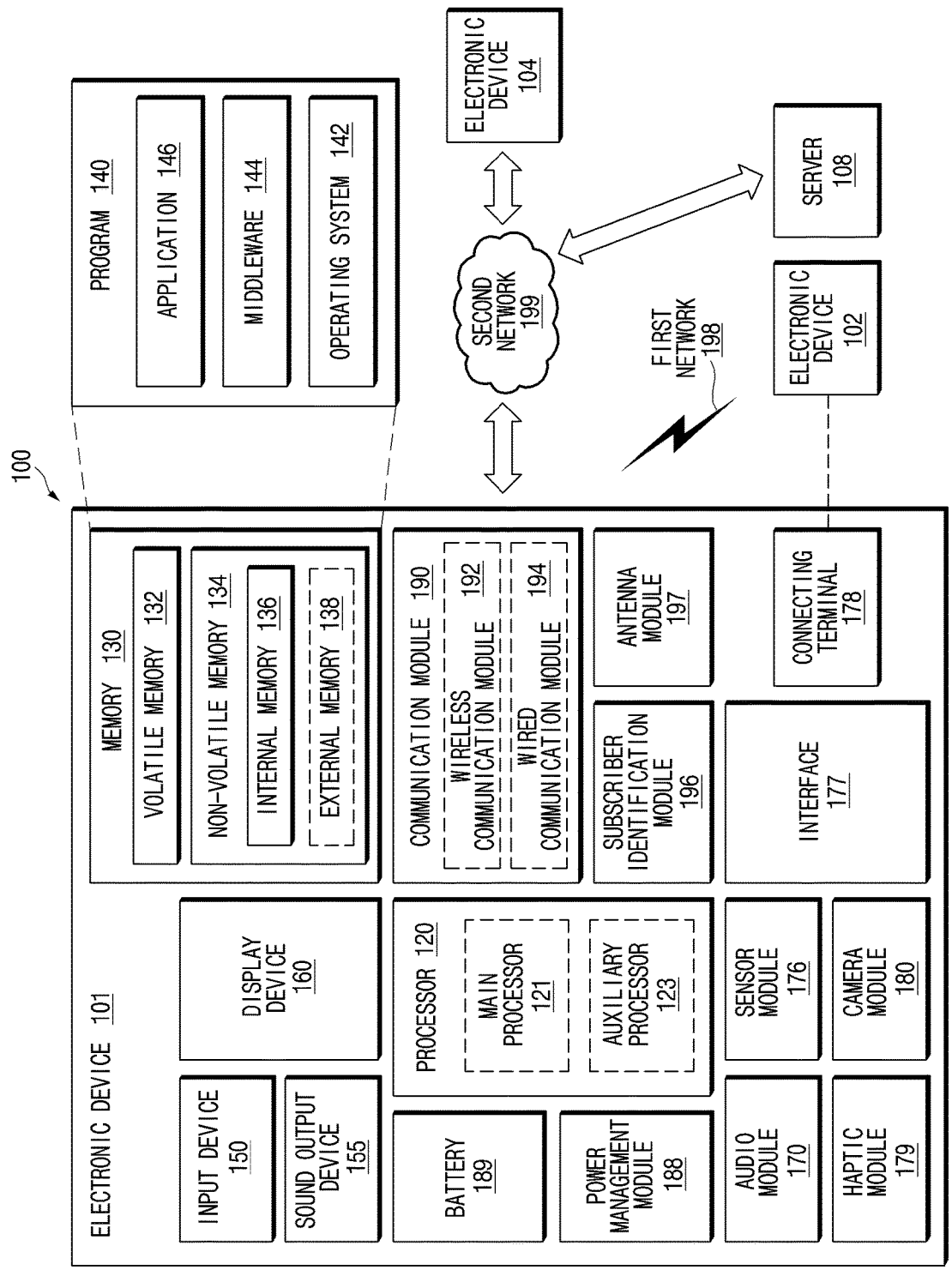
FIG. 1 illustrates an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In the specification, operations of an electronic device (e.g., the electronic device 101 of FIG. 1), an external electronic device (e.g., the electronic device 102 or the electronic device 104 of FIG. 1), or a server (e.g., the server 108 of FIG. 1) may be understood as being executed by a processor (e.g., the processor 120 of FIG. 1) executing instructions stored in a memory (e.g., the memory 130 of FIG. 1). However, they are not limited thereto. For another example, operations of an electronic device (e.g., the electronic device 101 of FIG. 1), an external electronic device (e.g., the electronic device 102 or the electronic device 104 of FIG. 1), or a server (e.g., the server 108 of FIG. 1) may be executed by using hardware external to the device through distributed computing technology.

Figure 2:
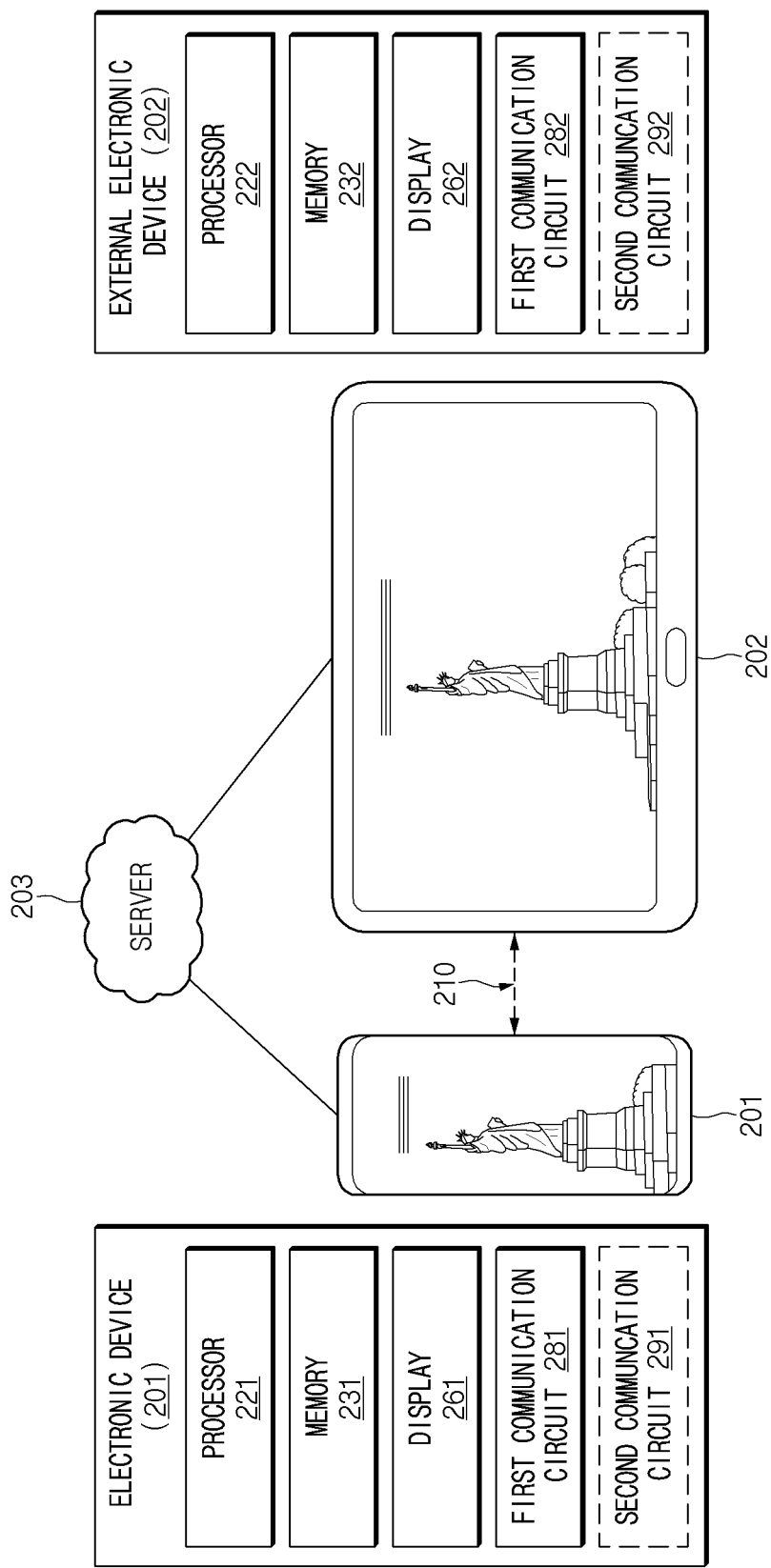
FIG. 2 illustrates a device-to-device connecting structure in which an electronic device establishes a communication connection with an external electronic device, according to an embodiment of the disclosure.

FIG. 2 illustrates a device-to-device connecting structure in which an electronic device (e.g., the electronic device 101 of FIG. 1) establishes a communication connection with an external electronic device (e.g., the electronic device 102 or the electronic device 104 of FIG. 1) according to an embodiment of the disclosure.

Referring to FIG. 2, an electronic device 201 according to an embodiment may include a processor 221 (e.g., the processor 120 of FIG. 1), a memory 231 (e.g., the memory 130 of FIG. 1), a display 261 (the display device 160 of FIG. 1), and a first communication circuit 281 (e.g., the communication module 190 of FIG. 1). For example, the electronic device 201 may further include a second communication circuit 291 (e.g., the communication module 190 of FIG. 1). The first communication circuit 281 and the second communication circuit 291 may be configured as separate chips or modules from each other, or may be formed as one chip or module. The first communication circuit 281 and the second communication circuit 291 may be referred to as communication interfaces supporting different wireless protocols. For example, the first communication circuit 281 may be a communication interface for a wireless protocol supporting communication between devices (e.g., sidelink, Bluetooth, Bluetooth low energy, Wi-Fi Direct, or Wi-Fi Aware). The first communication circuit 281 and the second communication circuit 291 may communication interfaces for different wireless protocols. According to an embodiment, the electronic device 201 may communicate with the server 203 through a long-range wireless communication protocol (e.g., a protocol supporting the second network 199 of FIG. 1). The processor 221 may control the operation of the electronic device 201 by executing instructions stored in the memory 231.

The external electronic device 202 according to an embodiment may include a processor 222 (e.g., the processor 120 of FIG. 1), a memory 232 (e.g., the memory 130 of FIG. 1), a display 262 (e.g., the display device 160 of FIG. 1), a first communication circuit 282 (e.g., the communication module 190 of FIG. 1), and/or a second communication circuit 292 (e.g., the communication module 190 of FIG. 1). The first communication circuit 282 and the second communication circuit 292 may be configured as separate chips or modules from each other, or may be formed as one chip or module. The first communication circuit 282 and the second communication circuit 292 may be referred to as communication interfaces supporting different wireless protocols. For example, the first communication circuit 282 may be a communication interface for a wireless protocol supporting communication between devices (e.g., sidelink, Bluetooth, Bluetooth low energy (BLE), Wi-Fi Direct, or Wi-Fi Aware). The second communication circuit 292 and the first communication circuit 282 may be communication interfaces for different wireless protocols. According to an embodiment, the external electronic device 202 may communicate with the server 203 through a long-range wireless communication protocol (e.g., a protocol supporting the second network 199 of FIG. 1). The processor 222 may control the operation of the external electronic device 202 by executing instructions stored in the memory 232.

According to an embodiment, in order to share content, the electronic device 201 may establish a communication connection 210 for transmitting and receiving data with the external electronic device 202. The communication connection 210 may be, for example, a peer-to-peer (P2P) communication connection such as a Wi-Fi Ad-hoc method, a mobile access point, and Wi-Fi Direct. For another example, the communication connection 210 may be a communication connection based on Bluetooth, low power Bluetooth, or Wi-Fi Aware. Content may be data stored in the memory 231 or data output by the electronic device 201. For example, the content may include multimedia data and/or text data stored in the memory 231. Alternatively, the content may include at least a part of a web page or a link address displayed on the display 261 of the electronic device 201 through a browser.

In order to establish the communication connection 210 with the external electronic device 202, the electronic device 201 may activate a communication module (e.g., the first communication circuit 281 and/or the second communication circuit 291) of the electronic device 201, search for nearby devices, including the external electronic device 202, and recognize the devices based on the searching result. For example, the electronic device 201 may recognize the external electronic device 202 by performing discovery. In order to select the external electronic device 202 to which data is to be transmitted from among recognized nearby devices, the electronic device 201 may display a list indicating nearby devices on the display 261 and receive a user input for selecting, in the list, an item corresponding to the external electronic device 202 to which data is to be transmitted.

In response to the user input, the electronic device 201 may establish the communication connection 210 with the external electronic device 202. For example, the electronic device 201 may recognize the external electronic device 202 based on a first wireless protocol, and may establish the communication connection 210 with the recognized external electronic device 202 based on a second wireless protocol. In this case, the electronic device 201 may recognize the external electronic device 202 by using the first communication circuit 281, and may establish the communication connection 210 with the external electronic device 202 by using the second communication circuit 291. For another example, the electronic device 201 may recognize the external electronic device 202 based on the first wireless protocol, and may establish the communication connection 210 with the recognized external electronic device 202 based on the first wireless protocol. In this case, the electronic device 201 may recognize the external electronic device 202 by using the first communication circuit 281, and may establish the communication connection 210 with the external electronic device 202 by using the first communication circuit 281. For example, the electronic device 201 may establish the communication connection based on the communication capability of the external electronic device 202. If the external electronic device 202 supports only one communication protocol (e.g., the first wireless protocol or the second wireless protocol), or it is difficult for the external electronic device 202 to support two communication protocols (e.g., the first wireless protocol and the second wireless protocol), the electronic device 201 may recognize the external electronic device 202 based on one communication protocol and may establish the communication connection 210.

According to an embodiment, the electronic device 201 may establish the communication connection 210 based on whether the external electronic device 202 is authenticated. For example, the electronic device 201 may communicate with the external electronic device 202 if the external electronic device 202 is a reliable device. For example, the electronic device 201 may authenticate the external electronic device 202 by using certificates of the electronic device 201 and the external electronic device 202 which are stored in the server 203. For another example, the electronic device 201 may authenticate the external electronic device 202 by using a certificate stored in the memory 231 of the electronic device 201. For another example, the electronic device 201 may authenticate the external electronic device 202 based on an identification number (e.g., a personal identification number (PIN)). The electronic device 201 may establish the communication connection 210 with the external electronic device 202 only when authentication of the external electronic device 202 is successful, and may transmit the content to the external electronic device 202 via the communication connection 210.

According to an embodiment, the electronic device 201 may perform mutual authentication based on first certificate data of the electronic device 201 and second certificate data of the external electronic device 202. The electronic device 201 and the external electronic device 202 according to an embodiment may have public certificate data for a reliable device in advance. Alternatively, according to an embodiment, the electronic device 201 and the external electronic device 202 may access the certificate data stored in the server 203 through the long-range wireless communication circuit to verify the received certificate data. For example, the electronic device 201 may control the first communication circuit 281 to broadcast an advertising packet. The advertising packet may be generated based on the first certificate data. For example, the electronic device 201 may generate the advertising packet to include data modulated by merging the first certificate data with the random number value. For another example, the electronic device 201 may acquire a hash value by inputting the first certificate data into a hash function, and may generate the advertising packet to include the acquired hash value. According to another embodiment, the electronic device 201 may acquire a shared key shared with the external electronic device and may generate the advertising packet to include the encrypted first certificate data based on the shared key. The external electronic device 202 may receive the broadcast advertising packet through a short-range wireless communication circuit. The external electronic device 202 may acquire the first certificate data from the received advertising packet. The external electronic device 202 may authenticate the electronic device 201 based on whether the acquired first certificate data is included in the certificate list provided from the server 203. For example, if a hash value of the first certificate data is included in the advertising packet, the first certificate data may be acquired from the hash value. For another example, a certificate list for one or more external electronic devices stored in an address book may include hash values of certificate data. In this case, the processor 222 may compare the hash values to authenticate the electronic device 201.

If the authentication for the electronic device is successfully completed, the external electronic device 202 may transmit a response packet including the second certificate data to the electronic device 201. If the electronic device 201 is not authenticated, the external electronic device 202 may not transmit the response packet. The processor 221 of the electronic device 201 may acquire the second certificate data from the received response packet. The processor 221 may authenticate the external electronic device 202 based on whether the acquired second certificate data is included in the certificate list of one or more electronic devices included in contact information (that is, whether the certificate data received from the server 203 matches the certificate data acquired from the response packet). For example, if a hash value of the second certificate data is included in the response packet, the second certificate data may be obtained from the hash value. For another example, the certificate list may include hash values of the certificate data, and the processor 221 may authenticate the external electronic device 202 by comparing the hash values. If authentication of the external electronic device 202 is successfully completed, the processor 221 may control the electronic device 201 to form a secure communication connection 210 with the external electronic device 202.

According to an embodiment, an account associated with the electronic device 201 (e.g., the account in the server 203) and an account associated with the external electronic device 202 (e.g., the account in the server 203) may be different from each other. According to an embodiment, the electronic device 201 may have identification information of the external electronic device 202. For example, the electronic device 201 may have, in contacts, identification information (e.g., contact information such as phone number, email address or mail account, device-specific identification information such as international mobile equipment identity (IMEI), or service subscriber identification information such as social media service account) of the external electronic device 202. If the electronic device 201 has the information of the external electronic device 202, the electronic device 201 may transmit content based on whether or not the external electronic device 202 accepts it.

According to an embodiment, the electronic device 201 may not have information of the external electronic device 202. For example, the external electronic device 202 may be an electronic device newly discovered by the electronic device 201. For another example, the external electronic device 202 may be an electronic device associated with identification information (e.g., contact information such as phone number, email address or mail account, device-specific identification information such as international mobile equipment identity (IMEI), or service subscriber identification information such as social media service account) that does not exist in the contacts of the electronic device 201. If the electronic device 201 does not have the information of the external electronic device 202, the electronic device 201 may authenticate the external electronic device 202 based on an identification number (e.g., PIN). After authentication of the external electronic device 202, the electronic device 201 may transmit content to the external electronic device 202.

According to an embodiment, the electronic device 201 and the external electronic device 202 may be electronic devices associated with the same account. For example, the external electronic device 202 may be another electronic device owned/managed by the user of the electronic device 201. For another electronic device belonging to the same account, the electronic device 201 may transmit content to the external electronic device 202 without separate authentication. In this case, authentication of the external electronic device 202 may be performed at the time of initial registration, and at the time of subsequent content transmission, authentication of the external electronic device 202 may be omitted.

According to an embodiment, the electronic device 201 may include the first communication circuit 281, the second communication circuit 291 supporting a wireless protocol different from the first communication circuit 281, and the display 261, the processor 221, and the memory 231. The processor 221 may be operatively connected to the first communication circuit 281, the second communication circuit 291, and the display 261. The memory 231 may be operatively connected to the processor 221 and may store one or more instructions that, when executed, causes the processor 221 to perform operations described below.

For example, the processor 221 may identify at least one external electronic device by using the first communication circuit 281, and transmit, to a first external electronic device, a state change request for causing the first external electronic device to transition to a first state if state change information indicating that the first external electronic device has transitioned from the first state to a second state consuming less power than the first state is received before transmitting data to the first external electronic device. The processor 221 may transmit the data to the first external electronic device by using the second communication circuit 291, after transmitting the state change request. For example, the processor 221 may determine whether to receive the state change information, and transmit the state change request to the first external electronic device based on the determination.

The processor 221 may be configured to sequentially transmit the data to the first external electronic device and the second external electronic device among the at least one external electronic device. For example, the processor 221 may transmit the data to the second external electronic device by using the second communication circuit 291, and after completing the transmission of the data to the second external electronic device, may transmit the state change request to the first external electronic device based on whether state change information is received. For example, the processor 221 may communicate with the first external electronic device and the second external electronic device by using the second communication circuit 291 based on a wireless communication protocol (e.g., Wi-Fi Direct) for one-to-one communication. For example, the processor 221 may transmit the data to the second external electronic device by using the second communication circuit 291 based on a second wireless communication protocol (e.g., Wi-Fi Aware). The processor 221 may transmit the data to the first external electronic device by using the second communication circuit 291 based on a third wireless communication protocol (e.g., Wi-Fi Direct) different from the second wireless communication protocol. For example, the first communication circuit 281 may be configured to support a communication protocol based on a Bluetooth communication standard, and the second communication circuit 291 may be configured to support a communication protocol based on a Wi-Fi communication standard.

The processor 221 may transmit a broadcasting signal including the state change request by using the first communication circuit 281. The broadcasting signal may include identification information of the first external electronic device.

The processor 221 may display information on the at least one external electronic device on the display 261, and may display information indicating a state change of the external electronic device on the display 261 based on the reception of the state change information from the first external electronic device.

For example, the processor 221 may identify the at least one external electronic device by receiving advertising signals from the at least one external electronic device by using the first communication circuit 281.

The processor 221 may transmit a connection request for data transmission to the first external electronic device by using the first communication circuit 281, based on the identity of an account associated with the first external electronic device and an account associated with the electronic device. For example, if the account associated with the first external electronic device and the account associated with the electronic device are the same, the processor 221 may transmit the connection request to the first external electronic device without separate authentication. For another example, if the account associated with the first external electronic device and the account associated with the electronic device are different, the processor 221 may transmit, to the first external electronic device, the connection request including an authentication request for the first external electronic device.

According to an embodiment, the external electronic device 202 may include the first communication circuit 282, the second communication circuit 292 supporting a wireless protocol different from the first communication circuit, the processor 222 operatively connected to the first communication circuit 282 and the second communication circuit 292, and the memory 232 operatively connected to the processor. The memory 232 may store one or more instructions that, when executed, cause the processor 222 to perform operations to be described below.

The processor 222 may broadcast the information of the external electronic device 202 by using the first communication circuit 282, receive a connection request from the electronic device 201 by using the second communication circuit 292, and transmit, to the electronic device 201, a response signal for accepting the connection request by using the second communication circuit 292.

The processor 222 may transmit, to the electronic device 201, state change information indicating a transition to a second state by using the first communication circuit 282 if the external electronic device 202 has transitioned from a first state to the second state consuming less power than the first state before receiving data from the electronic device 201. For example, the transition to the second state may include a transition of the second communication circuit 292 to a low power state. For example, the processor 222 may cause the external electronic device 202 to transition to the second state if the receiving of the data is not started within a specified time after transmitting the response signal. The processor 222 may receive the data from the electronic device 201 by using the second communication circuit 292 after transitioning to the first state.

The processor 222 may cause the external electronic device 202 to transition from the second state to the first state if a state change request is received from the electronic device 201 by using the first communication circuit 282 in the second state.

Figure 3:
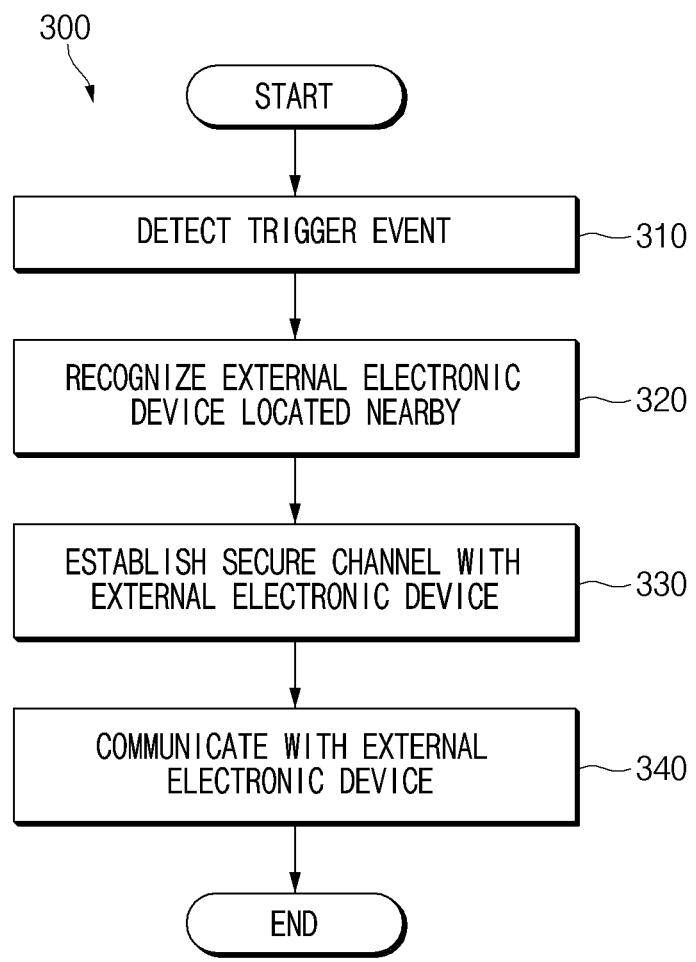
FIG. 3 is a flowchart illustrating a method for communication with an external electronic device by an electronic device, according to an embodiment of the disclosure.

FIG. 3 is a flowchart illustrating a method for communication with an external electronic device by an electronic device, according to an embodiment of the disclosure.

Referring to FIG. 3, in a method 300, in operation 310, an electronic device (e.g., the electronic device 201 of FIG. 1) may detect a trigger event. For example, if an image is captured by using a camera of the electronic device 201 (e.g., the camera module 180 of FIG. 1) and then the "share to nearby devices" menu item displayed on the electronic device 201 is selected, the electronic device 201 may detect a trigger event. For another example, if the electronic device 201 receives a user input of selecting the "copy" item to save data on a clipboard, or receives a user input of selecting the "paste to another device" item while data is saved on the clipboard, the electronic device 201 may detect a trigger event. For another example, if an input for activating data sharing of the electronic device 201 (e.g., executing a shared application) is received, the electronic device 201 may detect a trigger event.

In operation 320, the electronic device 201 may recognize an external electronic device (e.g., the external electronic device 202 of FIG. 2) located nearby. For example, the electronic device 201 may transmit (e.g., broadcast) a signal including information of the electronic device 201 by using a first communication circuit (e.g., the first communication circuit 281 of FIG. 2). The signal including information of the electronic device 201 may include an advertising packet. According to an embodiment, the electronic device 201 may recognize the external electronic device 202 by receiving the signal including information of the external electronic device 202 from the external electronic device 202. The signal including information of the external electronic device 202 may include an advertising packet. For example, the external electronic device 202 may transmit or broadcast the signal including information of the external electronic device 202 in response to the signal from the electronic device 201. For another example, the external electronic device 202 may be configured to broadcast the signal including information of the external electronic device 202 in a specified time period (e.g., a discovery period).

In operation 330, the electronic device 201 may establish a secure channel with the external electronic device 202. For example, the electronic device 201 may perform mutual authentication based on first certificate data of the electronic device 201 and second certificate data of the external electronic device 202. The electronic device 201 and the external electronic device 202 according to an embodiment may have public certificate data for a reliable device. Alternatively, according to an embodiment, the electronic device 201 and the external electronic device 202 may access the certificate data stored in a server (e.g., the server 203 of FIG. 2) to verify the received certificate data. Alternatively, according to an embodiment, the electronic device 201 and the external electronic device 202 may perform mutual authentication based on a specified identification number (e.g., PIN). If the external electronic device 202 is successfully authenticated, the electronic device 201 may establish a secure communication channel (e.g., the communication connection 210 of FIG. 2) with the external electronic device 202.

In operation 340, the electronic device 201 may communicate with the external electronic device 202 via the established secure communication channel. For example, if the trigger event is a command to transmit or share content data to or with the external electronic device 202, the electronic device 201 may transmit data to the external electronic device 202 via the established secure communication channel.

Hereinafter, communication methods of the electronic device 201 based on the state of the external electronic device 202 may be described. For example, the state of the external electronic device 202 may include a first state or a second state. The first state may refer to a state in which power consumption is high (e.g., a high power state). The first state may refer to a high power state (e.g., an active state or a wakeup state) of the processor 222 (e.g., an application processor) of the external electronic device 202. The first state may refer to a high power state (e.g., an active state or a wakeup state) of the display 262 of the external electronic device 202. The high power state of the display 262 may correspond to the high power state of the processor 222. The second state may refer to a state in which power consumption is low (e.g., a low power state). The second state may refer to a low power state (e.g., an inactive state or a sleep state) of the processor 222 of the external electronic device 202. The second state may refer to a low power state of the display 262 of the external electronic device 202. The low power state of the display 262 may include an off state (e.g., a screen-off state) or an always-on display (AOD) state. The display 262 may be converted into a low power state as the processor 222 is converted into a low power state.

According to an embodiment, in the second state, the external electronic device 202 may transmit and receive signals by using the first communication circuit 282. In the second state, the external electronic device 202 may not transmit and receive signals by using the second communication circuit 292. For example, the external electronic device 202 may have to transition from the second state to the first state in order to transmit and receive signals by using the second communication circuit 292.

According to an embodiment, the external electronic device 202 may transition from the first state to the second state based on a specified condition. For example, the external electronic device 202 may be configured to transition to the second state after a specified time (e.g., a time set by a user or a specified time) passes without a separate input. For example, the external electronic device 202 may be configured not to transmit an advertising signal in the second state. For another example, the external electronic device 202 may be configured to transmit an advertising signal indicating the second state in the second state.

According to an embodiment, when the external electronic device 202 transitions from the first state to the second state, the external electronic device 202 may transmit a signal indicating a state change to another device (e.g., the electronic device 201). The external electronic device 202 may cause the processor 222 to transition to the first state if a specified signal is received by using the first communication circuit 282 and/or the second communication circuit 292 in the second state. For example, in order to change the state of the processor 222, the first communication circuit 282 and/or the second communication circuit 292 may transmit an interrupt signal to the processor 222.

According to an embodiment, the electronic device 201 may receive state information of the external electronic device 202. The electronic device 201 may receive a signal including the state information of the external electronic device 202 from the external electronic device 202. For example, if a signal indicating that the external electronic device 202 is in the second state is received, the electronic device 201 may display information indicating that the external electronic device 202 is in the second state on the display 261. For another example, if the signal indicating that the external electronic device 202 is in the second state is received, the electronic device 201 may remove an object (e.g., image and/or text) corresponding to the external electronic device 202 from the user interface for sharing content.

According to an embodiment, the electronic device 201 may transmit a signal indicating the state change of the external electronic device 202 to the external electronic device 202. For example, if it is confirmed that the external electronic device 202 is in the second state at a time when data (or content) transmission to the external electronic device 202 is requested, the electronic device 201 may transmit the signal indicating the state change of the external electronic device 202 to the external electronic device 202. According to an embodiment, the electronic device 201 may transmit the signal indicating the state change to the external electronic device 202 via the first communication circuit. According to an embodiment, if the signal indicating the state change is received from the electronic device 201, the external electronic device 202 may transition from the second state to the first state.

In the following, for convenience of description, various embodiments have been described focusing on the electronic device 201 and the external electronic device 202; however, operations of the external electronic device 202 may be performed by the electronic device 201.

Figure 4:
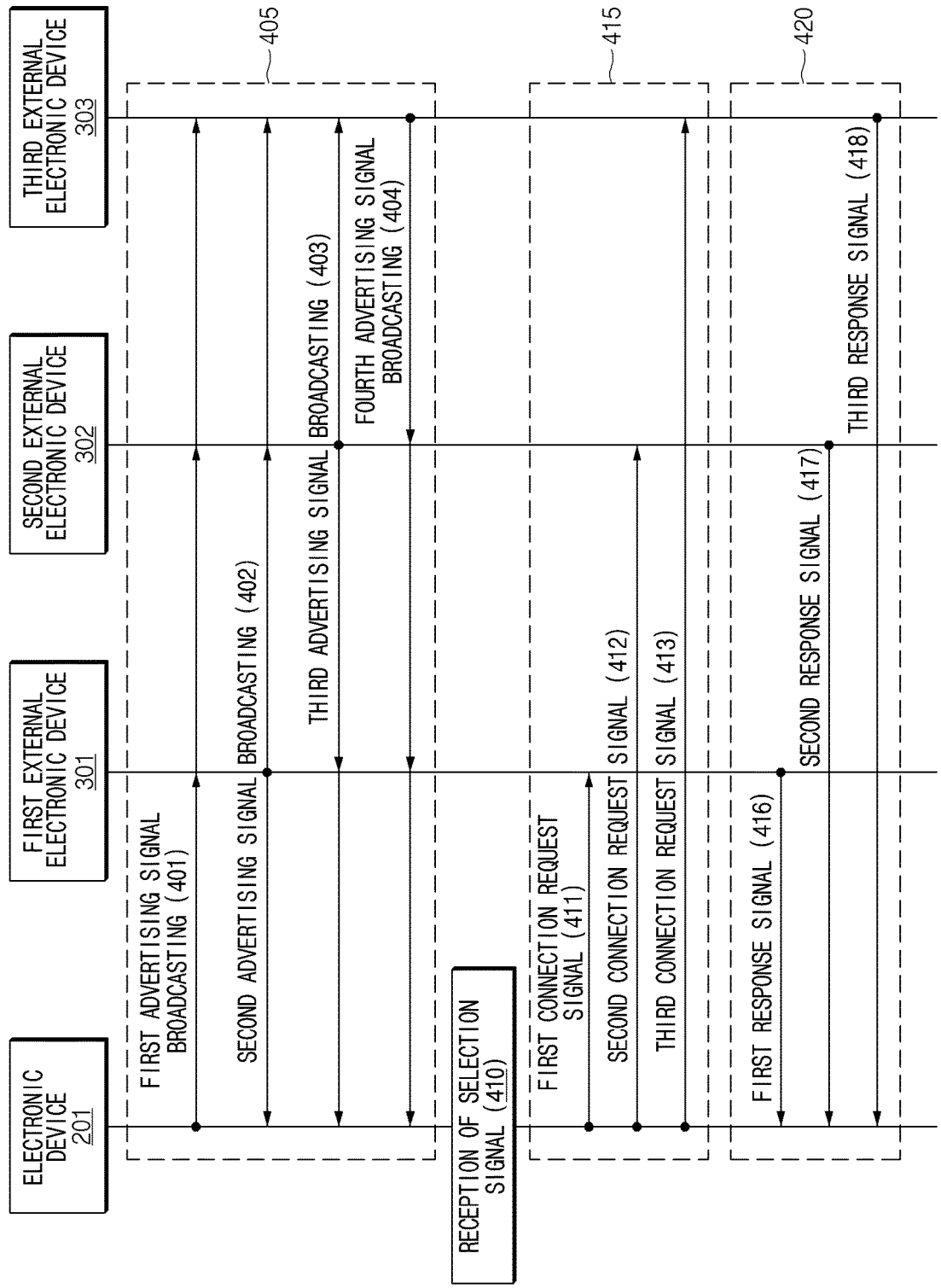
FIG. 4 is a signal flow diagram for connection between an electronic device and external electronic devices, according to an embodiment of the disclosure.

FIG. 4 is a signal flow diagram for connection between an electronic device and external electronic devices, according to an embodiment of the disclosure.

Referring to FIG. 4, the electronic device 201, a first external electronic device 301 (e.g., the external electronic device 202 of FIG. 2), a second external electronic device 302 (e.g., the external electronic device 202 of FIG. 2), and a third external electronic device 303 (e.g., the external electronic device 202 of FIG. 2) may communicate with each other. For example, the operations of FIG. 4 may be performed based on detection of a triggering event of the electronic device 201 (e.g., operation 310 of FIG. 3).

In operation 405, the electronic device 201 may recognize the external electronic devices 301, 302, and 303. For example, operation 405 may be referred to as discovery. In operation 401, the electronic device 201 may broadcast a first advertising signal. For example, the electronic device 201 may broadcast the first advertising signal by using the first communication circuit 281. The electronic device 201 may broadcast the first advertising signal based on Bluetooth or low power Bluetooth. The first advertising signal may include information of the electronic device 201. For example, the information of the electronic device 201 may include identification information, connectivity information, and/or state information of the electronic device 201. The identification information of the electronic device 201 may include information required for identification of the electronic device 201 (e.g., the name of the electronic device 201, the type of the electronic device 201, and/or the address of the electronic device 201). The connectivity information of the electronic device 201 may include information on the type and/or version of a protocol (e.g., Wi-Fi Direct, Wi-Fi Aware, Bluetooth, and/or low-power Bluetooth) supported by the electronic device 201. The state information of the electronic device 201 may include information indicating whether the electronic device is in a high power state (e.g., the first state) or a low power state (e.g., the second state). In operation 402, the first external electronic device 301 may broadcast a second advertising signal. In operation 403, the second external electronic device 302 may broadcast a third advertising signal. In operation 404, the third external electronic device 303 may broadcast a fourth advertising signal. For example, each of the second advertising signal, the third advertising signal, and the fourth advertising signal may include information of the associated electronic device (e.g., identification information, connectivity information, and/or state information). For example, the external electronic devices 301, 302, or 303 may broadcast an advertising signal by using a first communication circuit (e.g., the first communication circuit 282 of FIG. 2). Meanwhile, the order of transmission of the first, second, third, and fourth broadcasting signals of FIG. 4 is exemplary, and embodiments of the disclosure are not limited thereto. For example, if the electronic device 201 broadcasts the first advertising signal in operation 401 based on detecting the trigger event, the external electronic devices 301, 302 and 303 receiving the first advertising signal may transmit advertising signals including information of the external electronic devices.

In operation 405, the electronic device 201 may acquire information of the first external electronic device 301, the second external electronic device 302, and the third external electronic device 303 by receiving the second advertising signal, the third advertising signal, and the fourth advertising signal. For example, the electronic device 201 may identify and/or recognize the first external electronic device, the second external electronic device, and the third external electronic device based on the received information of the first external electronic device, the second external electronic device, and the third external electronic device. The electronic device 201 may provide a sharing UI (e.g., see FIG. 7) based on the received information of the first external electronic device, the second external electronic device, and the third external electronic device. For example, the sharing UI may include a menu for selecting a device to share content.

In operation 410, the electronic device 201 may receive a selection input. For example, the electronic device 201 may receive a selection input for selecting a device to share content based on a touch input of the user to the sharing UI. In the example of FIG. 4, it may be assumed that the electronic device 201 receives a selection input for the first external electronic device 301, the second external electronic device 302, and the third external electronic device 303.

In operation 415, according to an embodiment, the electronic device 201 may transmit a connection request signal to at least one of the external electronic devices 301, 302, and/or 303. According to an embodiment, the electronic device 201 may perform operation 405 by using the first communication circuit 281, and may perform operation 415 by using the second communication circuit 291. For example, the electronic device 201 may perform discovery based on a first wireless protocol (e.g., Bluetooth and/or low power Bluetooth) by using the first communication circuit 281, and may perform communication based on a second wireless protocol (e.g., Wi-Fi Aware and/or Wi-Fi Direct) on the identified external electronic devices by using the second communication circuit 291. According to an embodiment, operations 405 and 415 may be performed by using the first communication circuit 281. It is assumed that the external electronic devices 301, 302, and 303 support data transmission/reception based on the second wireless protocol; however, embodiments of the disclosure are not limited thereto. For example, at least one external electronic device may not support the second wireless protocol. In this case, the electronic device 201 may perform operations 405 and 415 with a corresponding external electronic device by using the first communication circuit 281.

In operation 415, according to an embodiment, the electronic device 201 may transmit a connection request signal based on connectivity (e.g., a supportable communication protocol) of the external electronic device. For example, the first external electronic device 301 may support one-to-one communication (e.g., Wi-Fi Direct), and the second external electronic device 302 may support one-to-many communication (e.g., Wi-Fi Aware). In this case, the electronic device 201 may not simultaneously transmit content to the first external electronic device 301 and the second external electronic device 302. For example, the first external electronic device 301 and the second external electronic device 302 may not simultaneously receive content from the electronic device 201 due to a limitation on the Wi-Fi standard. In this case, in operation 411, the electronic device 201 may transmit a first connection request signal to the first external electronic device 301 by using the second communication circuit 291. In operation 412, the electronic device 201 may transmit a second connection request signal to the second external electronic device 302 by using the second communication circuit 291. In an example, the third external electronic device 303 may support only the first wireless protocol. In this case, the electronic device 201 may transmit a third connection request signal to the third external electronic device 303 by using the first communication circuit 281.

In operation 420, the electronic device 201 may receive response signals from external electronic devices. For example, the response signals may include information on whether to accept connection indicated by external electronic devices. The external electronic device may acquire information on whether to accept connection based on a setting of the external electronic device or a user input, and may include information on whether to accept connection in the response signal. In operation 416, the first external electronic device 301 may transmit a first response signal to the electronic device 201. In operation 417, the second external electronic device 302 may transmit a second response signal to the electronic device 201. In operation 418, the third external electronic device 303 may transmit a third response signal to the electronic device 201. In the example of FIG. 4, connection acceptance may be indicated by the first response signal, the second response signal, and the third response signal.

In the example of FIG. 4, at least some of operations 415 and 420 may be omitted. For example, the third external electronic device 303 may be a reliable electronic device. For example, the third external electronic device 303 may be a device owned by the user of the electronic device 201 (e.g., the electronic device belonging to the same account as the electronic device 201). In this case, the transmission operation 413 of the third connection request signal and the reception 418 of the third response signal may be omitted. The electronic device 201 may not perform a separate connection request for a reliable external electronic device. According to an embodiment, the order of some of operation 415 and some of operation 420 may be changed. For example, after the second connection request signal is transmitted through operation 412, the second response signal may be received before the third connection request signal is transmitted through operation 413.

According to an embodiment, the electronic device 201 may perform authentication on an external electronic device through operations 415 and 420. For example, the second external electronic device 302 may be an electronic device about which the electronic device 201 does not have any information. The electronic device 201 may authenticate the second external electronic device 302 based on a PIN code. The electronic device 201 may successfully authenticate the second external electronic device 302 if information corresponding to the specified PIN code is included in the second response signal.

Figure 5:
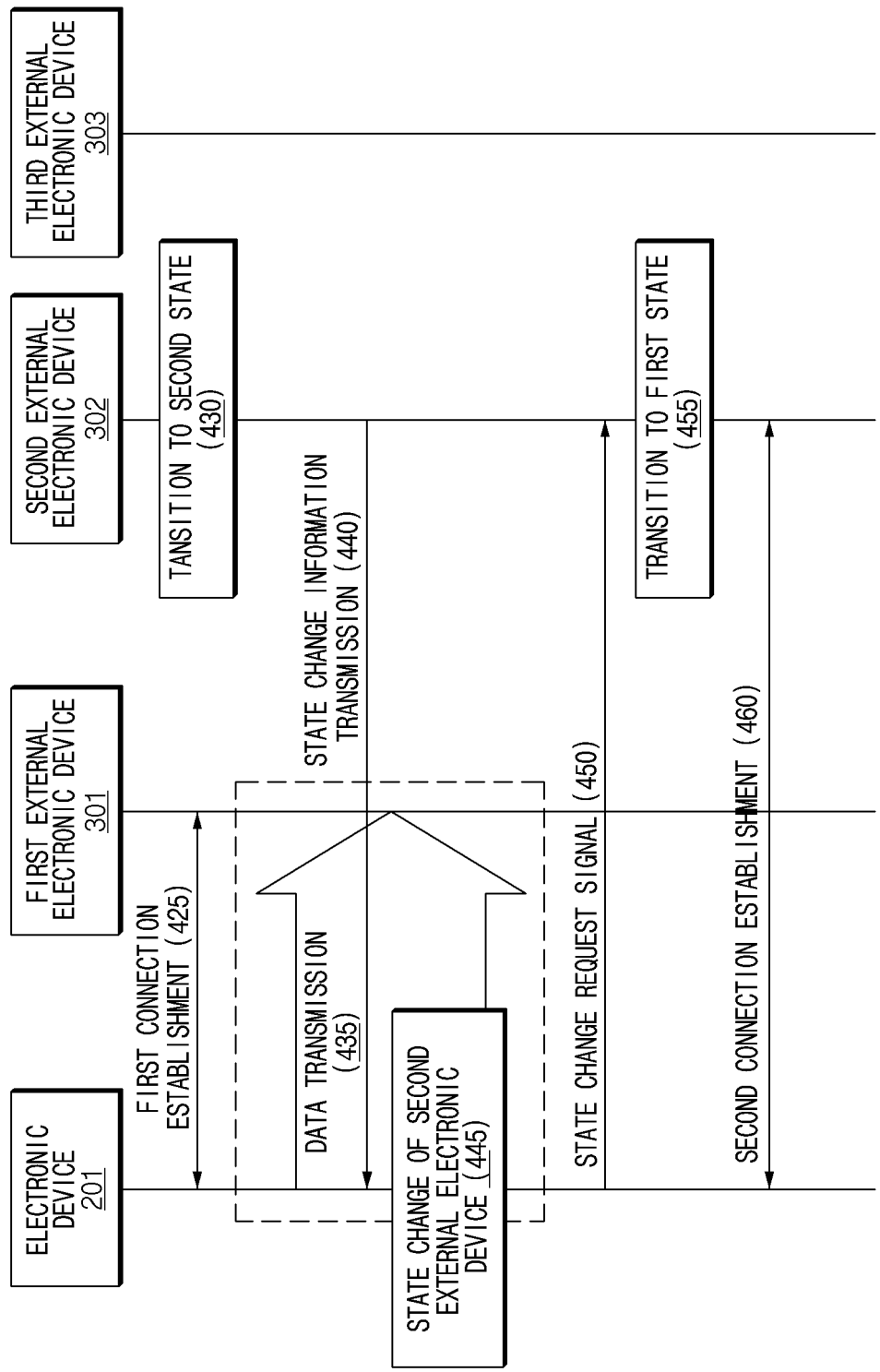
FIG. 5 is a signal flow diagram for changing states of an electronic device and external electronic devices, according to an embodiment of the disclosure.

FIG. 5 is a signal flow diagram for changing states of an electronic device and external electronic devices, according to an embodiment of the disclosure.

For example, operations of FIG. 5 may be performed subsequent to operation 420 of FIG. 4. In the example of FIG. 5, it may be assumed that each of the first external electronic device 301, the second external electronic device 302, and the third external electronic device 303 accepts connection with the electronic device 201 and is successfully authenticated.

Referring to FIG. 5, in operation 425, the electronic device 201 may establish a first connection with the first external electronic device 301. In operation 435, the electronic device 201 may transmit data corresponding to the content to the first external electronic device 301 via the established first connection. For example, the electronic device 201 may establish the first connection with the first external electronic device 301 and transmit the data to it, by using a second communication circuit (e.g., the second communication circuit 291 of FIG. 2) based on the second wireless protocol.

In operation 430, the second external electronic device 302 may transition to the second state. For example, the second external electronic device 302 may transition to the second state based on a specified condition (e.g., elapse of a specified time or user input). In operation 440, the second external electronic device 302 may transmit state change information to the electronic device 201 in response to the transition to the second state. For example, the state change information may indicate a transition from the first state to the second state. According to an embodiment, the second external electronic device 302 may transmit the state change information to the electronic device 201 by using a first wireless protocol (e.g., the wireless protocol supported by the first communication circuit 281). In an example, the second external electronic device 302 may broadcast state change information based on the first wireless protocol. In this case, the second external electronic device 302 may broadcast the state change information by using radio resources (e.g., time and/or frequency resources) shared between the electronic devices, and may set the destination of the corresponding broadcasting signal to the electronic device 201. For example, the first external electronic device 301 and the third external electronic device 303 receiving the broadcasting signal, the destination of which is set to the electronic device 201, may ignore the broadcasting signal from the second external electronic device 302.

In operation 445, the electronic device 201 may change the state of the second external electronic device 302 based on the state change information received from the second external electronic device 302. For example, in response to receiving the state change information, the electronic device 201 may update the state information of the second external electronic device 302 in a memory (e.g., the memory 231 of FIG. 2). The electronic device 201 may display information indicating the state change of the second external electronic device 302 on a display (e.g., the display 261 of FIG. 2). In an embodiment, the electronic device 201 may receive the state change information from the second external electronic device via a first communication circuit (e.g., the first communication circuit 281 of FIG. 2) during the operation for transmitting data to the first external electronic device via a second communication circuit (e.g., the second communication circuit 291 of FIG. 2).

The electronic device 201 may attempt to transmit data to the second external electronic device 302 after completing data transmission to the first external electronic device 301. In this case, since the second external electronic device 302 is in the second state, the electronic device 201 may cause the second external electronic device 302 to transition to the first state. In operation 450, the electronic device 201 may transmit a state change request signal to the second external electronic device 302. For example, the state change request may include information indicating the transition from the second state to the first state. According to an embodiment, the electronic device 201 may transmit the state change request by using a first wireless protocol (e.g., the wireless protocol supported by the first communication circuit 281). In an example, the electronic device 201 may broadcast a state change request based on the first wireless protocol. In this case, the electronic device 201 may broadcast the state change request by using radio resources (e.g., time and/or frequency resources) shared between the electronic devices, and may set the destination of the corresponding broadcasting signal to the second external electronic device 302. For example, the first external electronic device 301 and the third external electronic device 303 receiving the broadcasting signal, the destination of which is set to the second external electronic device 302, may ignore the state change request signal. According to an embodiment, the electronic device 201 may transmit the state change request signal to the second external electronic device 302 during transmitting data to the first external electronic device 301. For example, the electronic device 201 may predict a time to complete transmission of data to the first external electronic device 301, and may transmit the state change request signal to the second external electronic device 302 based on the predicted information.

In operation 455, the second external electronic device 302 may transition from the second state to the first state based on the state change request signal received from the electronic device 201. For example, the second external electronic device 302 may receive the state change request signal by using a wireless communication circuit (e.g., the first communication circuit 282 of FIG. 2). The wireless communication circuit may generate an interrupt signal for causing a processor of the second external electronic device 302 (for example, the processor 222 of FIG. 2) to transition to a high power state. The second external electronic device 302 may transition to the first state with the transition to the high power state.

According to an embodiment, the second external electronic device 302 may transmit a response message to the electronic device 201 after transitioning to the first state (e.g., operation 450). For example, the response message may include information indicating an acknowledgment (ACK) and/or a transition to the first state. The electronic device 201 may display information indicating the state change of the second external electronic device 302 on a display (e.g., the display 261 of FIG. 2) if the response message is received from the second external electronic device 302.

According to an embodiment, the electronic device 201 may establish a second connection (e.g., operation 460) based on the response message from the second external electronic device 302. If the response message is not received from the second external electronic device 302, the electronic device 201 may determine that data transmission to the second external electronic device 302 fails and may start data transmission to the third external electronic device 303. In this case, the electronic device 201 may not perform operation 460. If data transmission to the second external electronic device 302 fails, the electronic device 201 may output information indicating that data transmission to the second external electronic device 302 fails to a display (e.g., the display 261 of FIG. 2).

For example, after transmitting the state change request signal, if the response message is not received from the second external electronic device 302 within a specified time, the electronic device 201 may determine that data transmission to the second external electronic device 302 fails. For another example, if a response message is not received from the second external electronic device 302 (e.g., the response message is not received within a specified time), the electronic device 201 may attempt to change the state of the second external electronic device 302 a specified number of times. The electronic device 201 may attempt to change the state of the second external electronic device 302 by transmitting the state change request signal to the second external electronic device 302 and attempting or waiting to receive the response message for a specified time. If the electronic device 201 fails to receive the response message from the second external electronic device 302 despite attempts to change the state the specified number of times, the electronic device 201 may determine that data transmission to the second external electronic device 302 fails. For another example, the electronic device 201 may attempt to change the state of the second external electronic device 302 during transmitting data to the first external electronic device 301 (e.g., operation 435). If data transmission to the first external electronic device 301 is completed or the response message is not received from the second external electronic device 302 within a specified time after completion of the data transmission, the electronic device 201 may determine that data transmission to the second external electronic device 302 fails.

In operation 460, the electronic device 201 may establish a second connection with the second external electronic device 302. The electronic device 201 may transmit data corresponding to the content to the second external electronic device 302 via the established second connection. For example, the electronic device 201 may establish the second connection and transmit the data, by using the second communication circuit 391 based on the second wireless protocol. In an example, the electronic device 201 may also perform authentication of the second external electronic device 302 in operation 460.

If the electronic device 201 transmits the content to a plurality of external electronic devices, the electronic device 201 may sequentially perform a plurality of data transmissions depending on the difference in wireless protocols between the external electronic devices and/or the maximum number of the electronic devices simultaneously performing reception. In this case, while the electronic device 201 is transmitting data to the external electronic device, another external electronic device may transition to the second state.

In the example of FIG. 5, the second external electronic device 302 may transition to the second state while waiting for data reception. In this case, since the second external electronic device 302 may not transmit and receive signals using a second communication circuit (e.g., the second communication circuit 292 of FIG. 2), the second external electronic device 302 may transmit the state change information to the electronic device 201 via a first communication circuit (e.g., the first communication circuit 282 of FIG. 2). Using the state change information, the electronic device 201 may prevent data transmission failure. In addition, the electronic device 201 may transmit the state change request to the second external electronic device 302 via the first communication circuit in order to transmit data. Since the second external electronic device 302 may maintain the second state until the state change request is received, power consumption of the second external electronic device 302 may be reduced.

In the example of FIGS. 4 and 5, data has been described as being sequentially transmitted to each external electronic device; however, embodiments of the disclosure are not limited thereto. For example, for Wi-Fi Aware, the electronic device 201 may simultaneously transmit data to a plurality of external electronic devices. Even in this case, the electronic device 201 may sequentially transmit data to the plurality of external electronic devices. For example, for Wi-Fi Aware, the maximum number of external electronic devices capable of performing simultaneous reception may be limited to a specified number (e.g., 5). If the number of external electronic devices for which content sharing is requested exceeds a specified number, the electronic device 201 may sequentially transmit data at least two times.

The order of data transmission described above with respect to FIGS. 4 and 5 is exemplary, and embodiments of the disclosure are not limited thereto. According to an embodiment, if data is transmitted to a plurality of external electronic devices, the electronic device 201 may determine the order of the data transmission based on various information. In an example, the electronic device 201 may receive transition time information (e.g., information on a screen timeout time) of external electronic devices to the second state, and may determine the order of transmission to the external electronic devices based on the transition time to the second state. The electronic device 201 may first transmit data to an external electronic device having a short time in transitioning to the second state. In an example, the electronic device 201 may determine the order of transmission based on the amount of data to be transmitted. For example, if the amount of data to be transmitted is less than a specified amount, the electronic device 201 may transmit data in an arbitrary order. If the amount of data to be transmitted is equal to or greater than a specified amount, the electronic device 201 may further determine the order of data transmission based on other information. In an example, the electronic device 201 may determine the order of transmission based on an estimated time required to transmit data. The electronic device 201 may transmit data from an external electronic device having an estimated short time required to transmit data based on a communication state of the external electronic device and/or a supported wireless protocol. In an example, the electronic device 201 may transmit data based on the distance of the external electronic device. The electronic device 201 may transmit data starting from an external electronic device closest to the electronic device 201. In an example, the electronic device 201 may sequentially transmit data based on the input of the user. The electronic device 201 may sequentially transmit data to the external electronic device according to the order of user input. In an example, the electronic device 201 may first transmit data to an external electronic device supporting a one-to-many wireless protocol. The electronic device 201 may transmit data to the external electronic device supporting the one-to-many wireless protocol and then transmit data to an external electronic device supporting a one-to-one wireless protocol. In an example, the electronic device 201 may transmit data according to a specified order. The electronic device 201 may have priority information set for each wireless protocol or an external electronic device.

Figure 6:
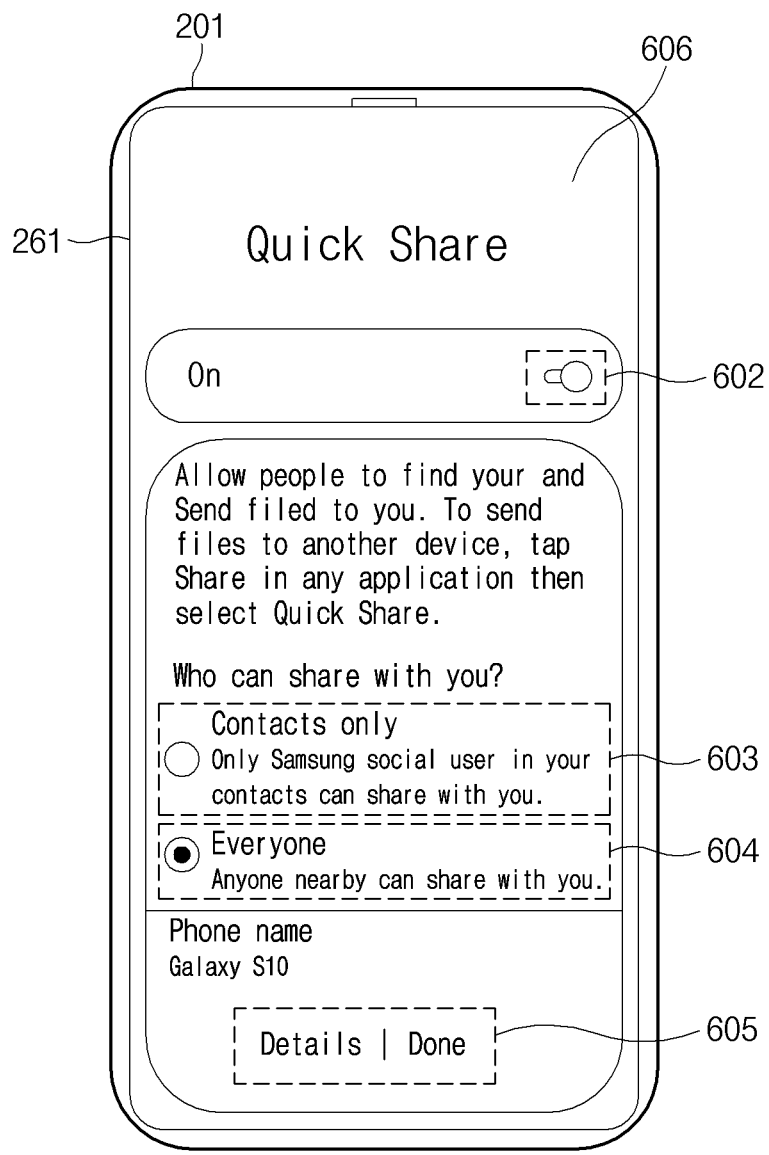
FIG. 6 illustrates a setting user interface (UI) of an electronic device according to an embodiment of the disclosure.

FIG. 6 illustrates a setting UI of an electronic device according to an embodiment of the disclosure.

Referring to FIG. 6, the electronic device 201 may provide the setting UI 606 on the display 261. For example, a setting UI 606 may provide settings for sharing content. For example, the setting UI 606 may include an interface 602 for setting activation of content sharing. For example, the electronic device 201 may activate or deactivate content sharing based on an input to the interface 602.

For example, the setting UI 606 may provide a content sharing range setting. If the electronic device 201 is set to a friend mode 603, the electronic device 201 may share content only with the external electronic device stored in the contact of the electronic device 201 and the user's electronic device. If the electronic device 201 is set to an all mode 604, the electronic device 201 may share content with all nearby external electronic devices. For example, in the friend mode 603, the electronic device 201 may not display an advertising packet on the display 261 even if the electronic device 201 receives the advertising packet from an electronic device other than the user's electronic device and/or an external electronic device that is not stored in the contact.

According to an embodiment, when content sharing is activated (e.g., when sharing is activated in response to receiving input to the interface 602), or when an input indicating completion (e.g., input to Done of a button 605) is received in a state in which content sharing is activated, the electronic device 201 may broadcast the advertising signal (e.g., operation 401 of FIG. 4).

Figure 7:
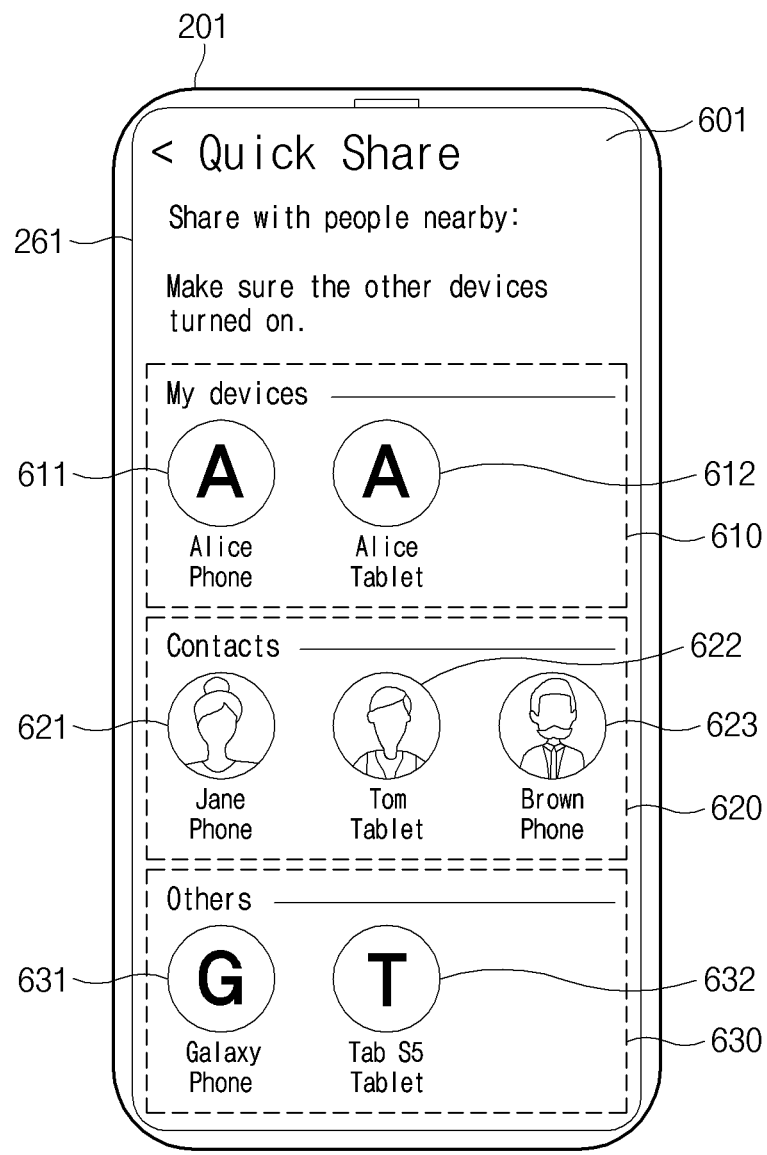
FIG. 7 illustrates a sharing UI of an electronic device according to an embodiment of the disclosure.

FIG. 7 illustrates a sharing UI 601 of the electronic device 201 according to an embodiment of the disclosure.

Referring to FIG. 7, for example, the electronic device 201 may display, on the display 261, the sharing UI 601 providing information on the recognized external electronic device and allowing selection. For example, external electronic devices displayed on the sharing UI 601 may be external electronic devices recognized by receiving advertising signals from external electronic devices (e.g., operation 405 of FIG. 4).

According to an embodiment, the electronic device 201 may generate a list of external electronic devices based on types of the external electronic devices. For example, the sharing UI 601 may include its own electronic device list 610, a contact information-based device list 620, and another electronic device list 630. The own electronic device list 610 may include information on other electronic devices (e.g., a first same account device 611 and a second same account device 612) belonging to the same account as the electronic device 201. The contact information-based device list 620 may include information on external electronic devices (e.g., a first external electronic device 621, a second external electronic device 622, and a third external electronic device 623) matching contact information of the electronic device 201. For example, the contact information-based device list 620 may include at least one of external electronic devices (e.g., the first external electronic device 621, the second external electronic device 622, or the third external electronic device 623) that transmit a response signal (e.g., an advertising signal) to an advertising signal transmitted by the electronic device 201. For example, the electronic device 201 may display the contact information-based device list 620 based on identification information (e.g., contact information such as phone number, email address or mail account, device-specific identification information such as international mobile equipment identity (IMEI), or service subscriber identification information such as social media service account) received from the external electronic devices. The other electronic device list 630 may include information on electronic devices that do not belong to the account of the electronic device 201 and do not match contact information (e.g., the first other device 631 and the second other device 632), among discovered electronic devices.

In the example of FIG. 7, if the electronic device 201 is set to the friend mode 603 of FIG. 6, the electronic device 201 may omit the other electronic device list 630 from the sharing UI 601.

According to an embodiment, as in operation 410 of FIG. 4, the electronic device 201 may receive an input of selecting at least one external electronic device to transmit content in the list of external electronic devices (e.g., the own electronic device list 610, the contact information-based device list 620, or the other electronic device list 630) displayed on the sharing UI 601. According to an embodiment, the electronic device 201 may transmit the connection request signal to at least one external electronic device based on the received input as in operations 411 to 413 of FIG. 4. For example, the electronic device 201 may transmit the connection request signal to at least one external electronic device by using the second communication circuit 291.

Figure 8:
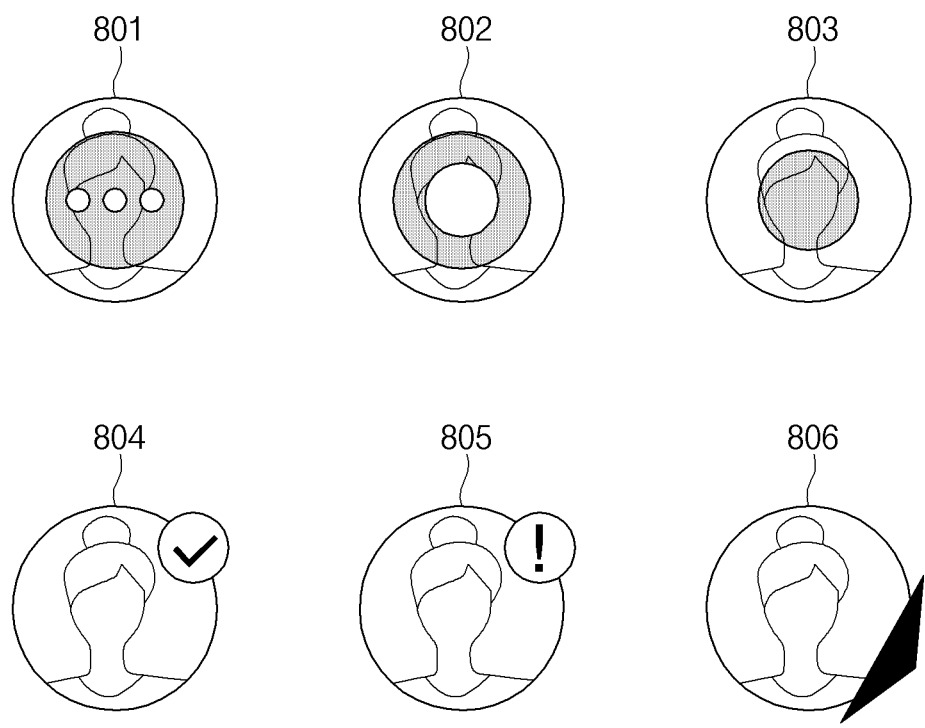
FIG. 8 illustrates examples of icons according to a data sharing situation according to an embodiment of the disclosure.

FIG. 8 illustrates examples of icons according to a data sharing situation according to an embodiment of the disclosure.

Referring to FIG. 8, the electronic device 201 may display a state of an external electronic device via an icon of the sharing UI 601. In various state display icons based on the first external electronic device 621 of FIG. 7 may be described.

According to an embodiment, the electronic device 201 may display icons based on a communication state. A first icon 801 indicates that data transmission to a corresponding external electronic device is waiting. For example, when data for another external electronic device is being transmitted, and the corresponding external electronic device is waiting to receive data after data transmission to the other external electronic device is completed, the corresponding electronic device may be displayed in a form similar to the first icon 801. A second icon 802 indicates that a secure connection to the corresponding external electronic device is being established. A third icon 803 indicates that data is being transmitted to the corresponding external electronic device. A fourth icon 804 indicates that data transmission to the corresponding external electronic device is successfully completed. A fifth icon 805 indicates that data transmission to the corresponding external electronic device fails at least partially.

According to an embodiment, the electronic device 201 may display an icon based on position information of an external electronic device. For example, the electronic device 201 may acquire an angle of arrival and/or a reception strength from an advertising signal from an external electronic device. A sixth icon 806 may include an indicator indicating a relative direction (e.g., lower right) of a corresponding external electronic device with respect to the electronic device 201. The electronic device 201 may display the distance of the external electronic device through the size of the indicator. For example, the direction of the indicator may be set based on the angle of arrival, and the size of the indicator may be set based on the reception strength.

The icons referring to FIG. 8 are exemplary, and embodiments of the disclosure are not limited thereto. For example, the electronic device 201 may display the state of the external electronic device by using text information.

Figure 9:
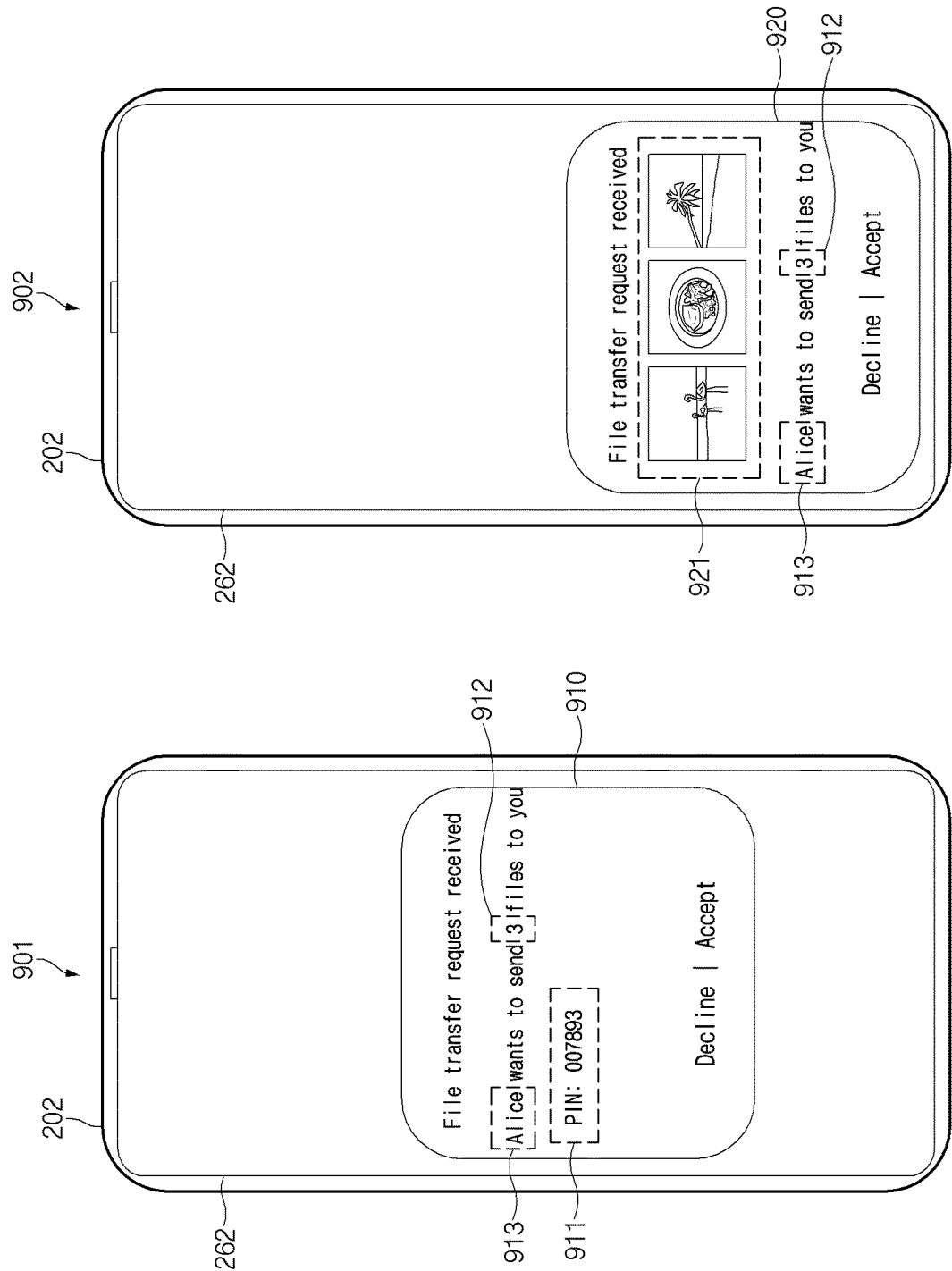
FIG. 9 illustrates a connection request UI in an external electronic device according to an embodiment of the disclosure.

FIG. 9 illustrates a connection request UI in an external electronic device according to an embodiment of the disclosure.

Referring to FIG. 9, connection request UIs 910 or 920 of FIG. 9 may be displayed on the display 262 of the external electronic device 202 when the connection request (e.g., operation 415 of FIG. 4) is received from the external electronic device 202. The connection request UI may include information for prompting the user of the external electronic device 202 whether to receive content.

With reference to reference numeral 901, a connection request UI 910 may be a pop-up message inquiring whether to receive a file. For example, the connection request UI 910 may include information 913 of a file sender (e.g., Alice), the number 912 of files (e.g., 3), and/or PIN code information 911 (e.g., PIN: 007893). In an example, if the external electronic device 202 does not acquire information on the number of files from the connection request, the number 912 of files may be omitted.

With reference to reference numeral 902, a connection request UI 920 may be a pop-up message inquiring whether to receive a file. For example, the connection request UI 920 may include information 913 of a file sender (e.g., Alice), the number 912 of files (e.g., 3), and/or a thumbnail 921 of the file. For example, after transmitting a connection request signal (e.g., operation 415 of FIG. 4), the electronic device 201 may transmit data of the thumbnail 921 to the electronic device 201 by using one or more signals. For another example, the electronic device 201 may transmit the address of the thumbnail 921 (e.g., a uniform resource locator (URL) or a compressed URL) to the external electronic device 202. For yet another example, the electronic device 201 may transmit summary information of a file instead of the thumbnail 921. In this case, the summary information may include information (e.g., text information) extracted based on machine learning on the content to be transmitted.

According to an embodiment, the external electronic device 202 may display the connection request UI based on a relationship with the electronic device 201. For example, if the external electronic device 202 is an electronic device of an account stored in the contact of the electronic device 201, the external electronic device 202 may display the connection request UI 920 of reference numeral 902. For another example, if the external electronic device 202 is another device (for example, the other device 631 or 632 of FIG. 7), the external electronic device 202 may communicate with the electronic device 201 based on the PIN code. In this case, the external electronic device 202 may display the connection request UI 920 of reference numeral 901.

If the external electronic device 202 receives a connection acceptance input (e.g., an input for "Accept"), the external electronic device 202 may transmit, to the electronic device 201, a response signal indicating connection acceptance. For example, if the connection acceptance response is received, the electronic device 201 may try to connect to the corresponding device in order. If the external electronic device 202 receives a connection decline input (e.g., an input for "Decline"), the external electronic device 202 may transmit, to the electronic device 201, a response signal indicating connection decline. In this case, the electronic device 201 may display information indicating failure of data transmission (e.g., the fifth icon 805 of FIG. 8).

Figure 10:
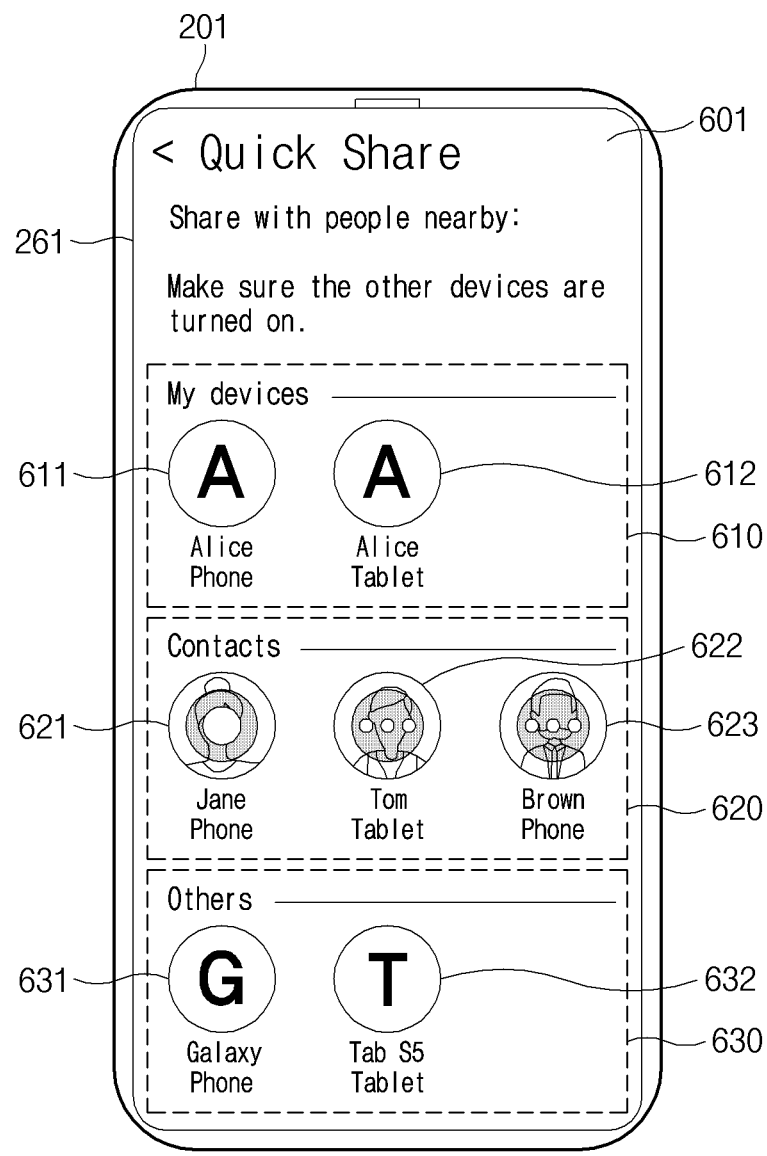
FIG. 10 illustrates a sharing UI during connection with a first external electronic device according to an embodiment of the disclosure.

FIG. 10 illustrates a sharing UI during connection with a first external electronic device according to an embodiment of the disclosure.

Referring to FIG. 10, for example, the sharing UI 601 may be a sharing UI displayed on the display 261 of the electronic device 201 during operation 425 of FIG. 4.

The electronic device 201 may be configured to share content with the first external electronic device 621, the second external electronic device 622, and the third external electronic device 623. For example, the electronic device 201 may be configured to first transmit data to the first external electronic device 621, and transmit data to the remaining external electronic devices after data transmission to the first external electronic device 621. In the example of FIG. 10, the first external electronic device 621 may be displayed as being connected (e.g., the second icon 802 of FIG. 8), and the second external electronic device 622 and the third external electronic device 623) may be displayed as waiting (e.g., the first icon 801 of FIG. 8).

According to an embodiment, the sharing UI 601 of FIG. 10 may display only state information of the first external electronic device 621, and the second external electronic device 622, and the third external electronic device 623 selected to share content. For example, once content sharing is started, the sharing UI 601 may include state information of electronic devices (e.g., the first external electronic device 621, the second external electronic device 622, and the third external electronic device 623) to which the content is currently shared, and may not include at least one of the discovered remaining electronic devices 611, 612, 631, and 632.

According to an embodiment, if sharing of content is started, the electronic device 201 may display the external electronic device and the remaining electronic devices to be shared as a separate list. For example, the sharing UI 601 may display a list of shared electronic devices and a list of other electronic devices in a visually separated manner. In the example of FIG. 10, the list of shared electronic devices may include the first external electronic device 621, the second external electronic device 622, and the third external electronic device 623, and the list of other electronic devices may include the remaining electronic devices (e.g., 611, 612, 631, and 632).

Figure 11:
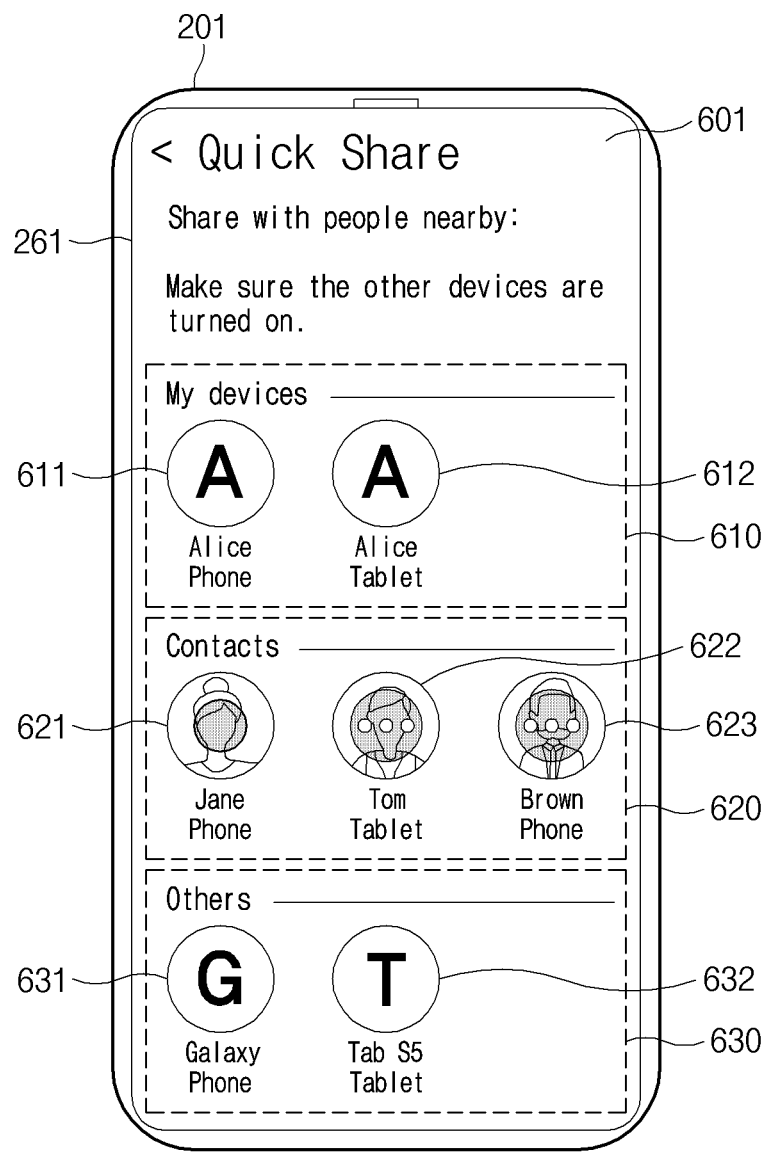
FIG. 11 illustrates a sharing UI during data transmission to the first external electronic device according to an embodiment of the disclosure.

FIG. 11 illustrates a sharing UI during data transmission to the first external electronic device according to an embodiment of the disclosure.

Referring to FIG. 11, the electronic device 201 may be transmitting data to the first external electronic device 621. In this case, the first external electronic device 621 may be displayed as transmitting data (e.g., the third icon 803 of FIG. 8). For example, after the connection between the electronic device 201 and the first external electronic device 621 of FIG. 10 is successfully performed, the state of the first external electronic device 621 may be changed as illustrated in FIG. 11 with the start of the data transmission.

Figure 12:
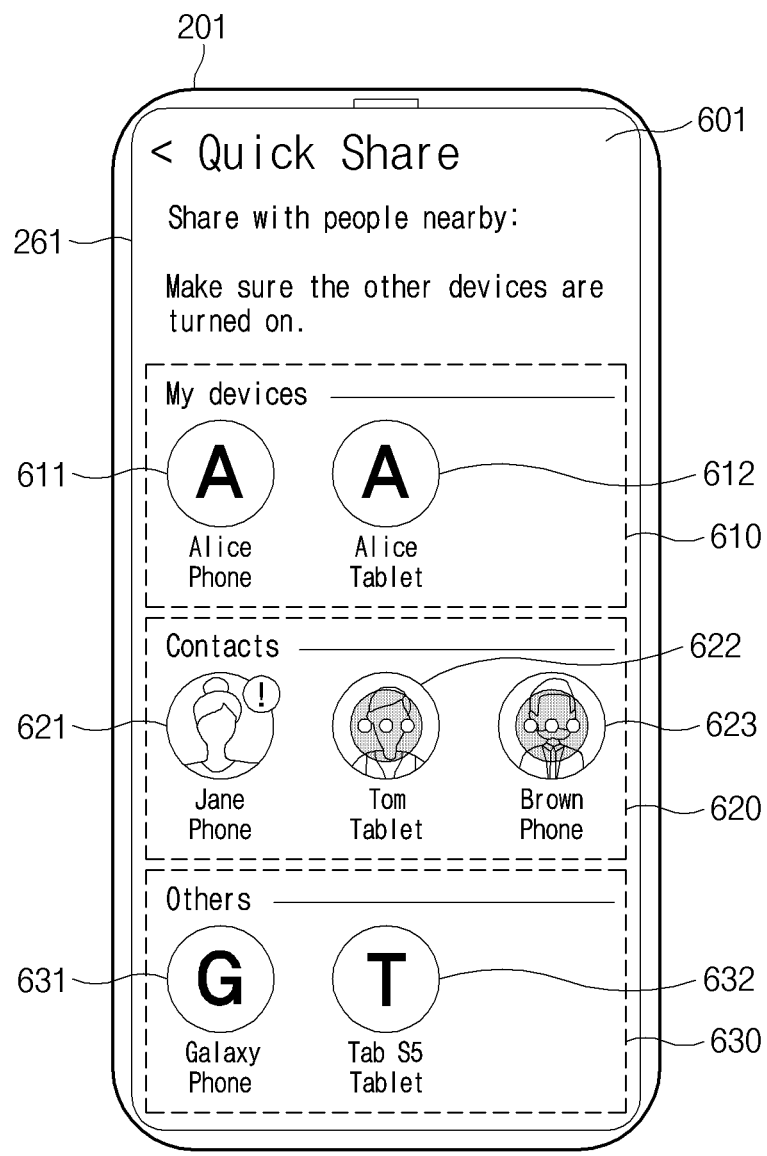
FIG. 12 illustrates a sharing UI when data transmission to the first external electronic device fails according to an embodiment of the disclosure.

FIG. 12 illustrates a sharing UI when data transmission to the first external electronic device fails according to an embodiment of the disclosure.

Referring to FIG. 12, the electronic device 201 may fail to transmit data to the first external electronic device 621. In this case, the first external electronic device 621 may be displayed as data transmission failure (e.g., the fifth icon 805 of FIG. 8). For example, if the electronic device 201 receives, from the first external electronic device 621, a response signal indicating connection decline, or if data transmission fails due to a communication failure, the electronic device 201 may display the first external electronic device 621 as data transmission failure.

Figure 13:
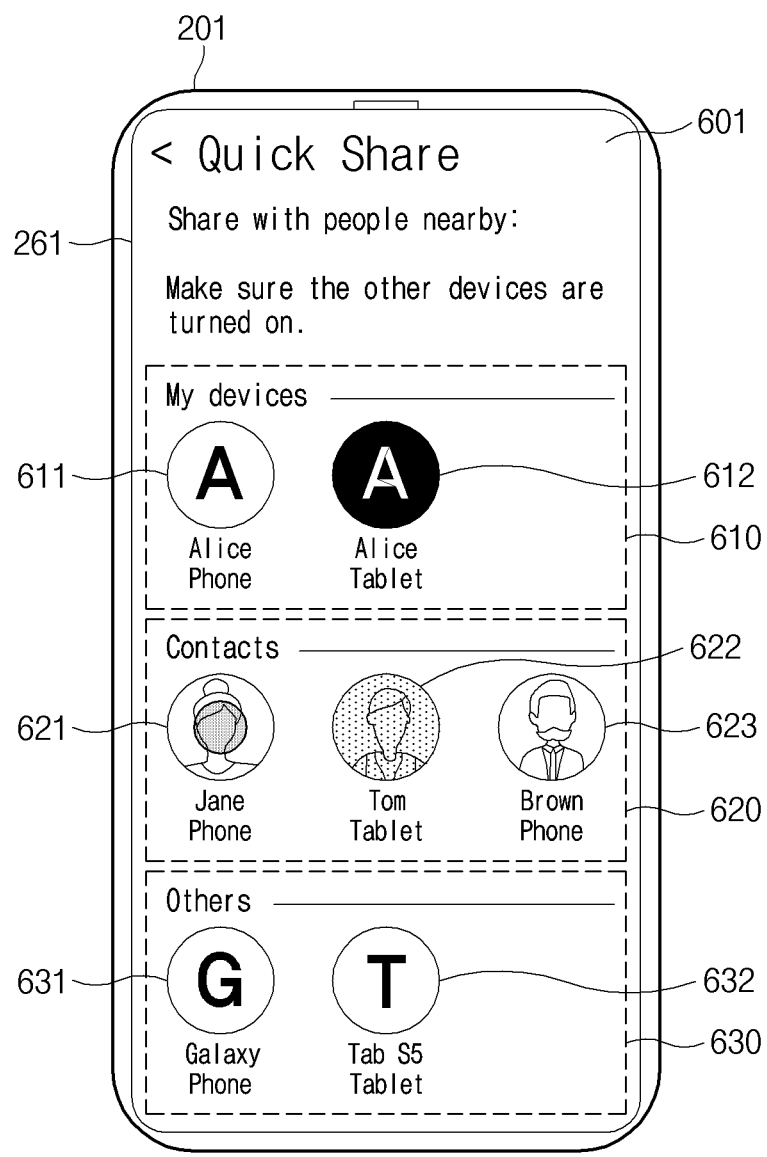
FIG. 13 illustrates a sharing UI by a change to a second state according to an embodiment of the disclosure.

FIG. 13 illustrates a sharing UI by a change to a second state according to an embodiment of the disclosure.

Referring to FIG. 13, the electronic device 201 may receive state change information from the second same account device 612 and the second external electronic device 622 (e.g., operation 440 of FIG. 4).

According to an embodiment, in response to receiving the state change information, the electronic device 201 may display that the second same account device 613 and the second external electronic device 622 transition to the second state, on the sharing UI 601. For example, the electronic device 201 may display that the second same account device 613 and the second external electronic device 622 transition to the second state by changing the chroma, brightness, contrast, and/or shape of the second same account device 613 and the second external electronic device 622.

According to an embodiment, in response to receiving the state change information, the electronic device 201 may perform display by removing or changing the second same account device 613 and/or the second external electronic device 622 from the sharing UI 601 based on the content sharing state. For example, the electronic device 201 may change the chroma, brightness, contrast, and/or shape of the second external electronic device 622 currently sharing content. For another example, the electronic device 201 may remove the second same account device 613 that does not currently share content from the sharing UI 601.

Figure 14:
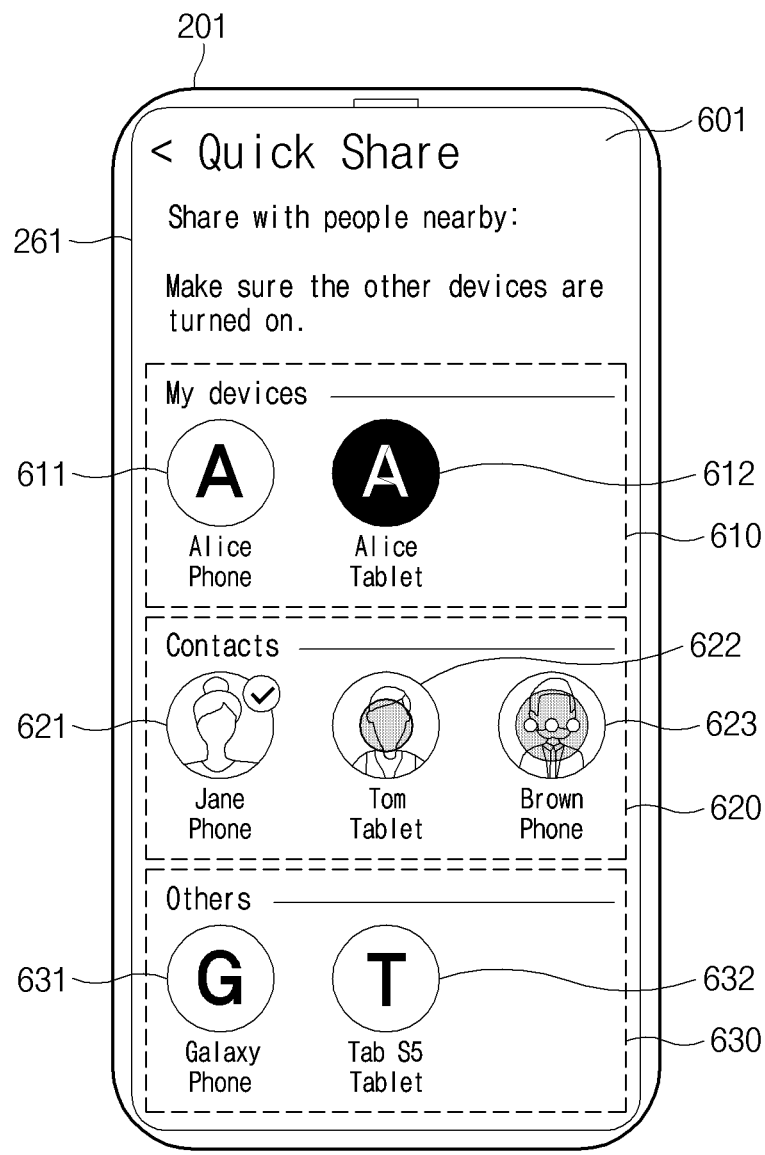
FIG. 14 illustrates a sharing UI when data transmission to the first external electronic device is completed according to an embodiment of the disclosure.

FIG. 14 illustrates a sharing UI when data transmission to the first external electronic device is completed according to an embodiment of the disclosure.

Referring to FIG. 14, the electronic device 201 may display the first external electronic device 621 in a transmission completion state (e.g., the fourth icon 804 of FIG. 8) as the data transmission to the first external electronic device 621 (e.g., operation 435 of FIG. 4) is completed. According to an embodiment, as data transmission to the second external electronic device 622 is started, the electronic device 201 may display the second external electronic device 622 in a state in which data is being transmitted (e.g., the third icon 803 of FIG. 8). For example, the electronic device 201 may transmit the state change request signal to the second external electronic device 622 (e.g., operation 450 of FIG. 5) and transmit data to the second external electronic device 622. According to an embodiment, the electronic device 201 may display the third external electronic device 623 as waiting (e.g., the first icon 801 of FIG. 8).

Figure 15:
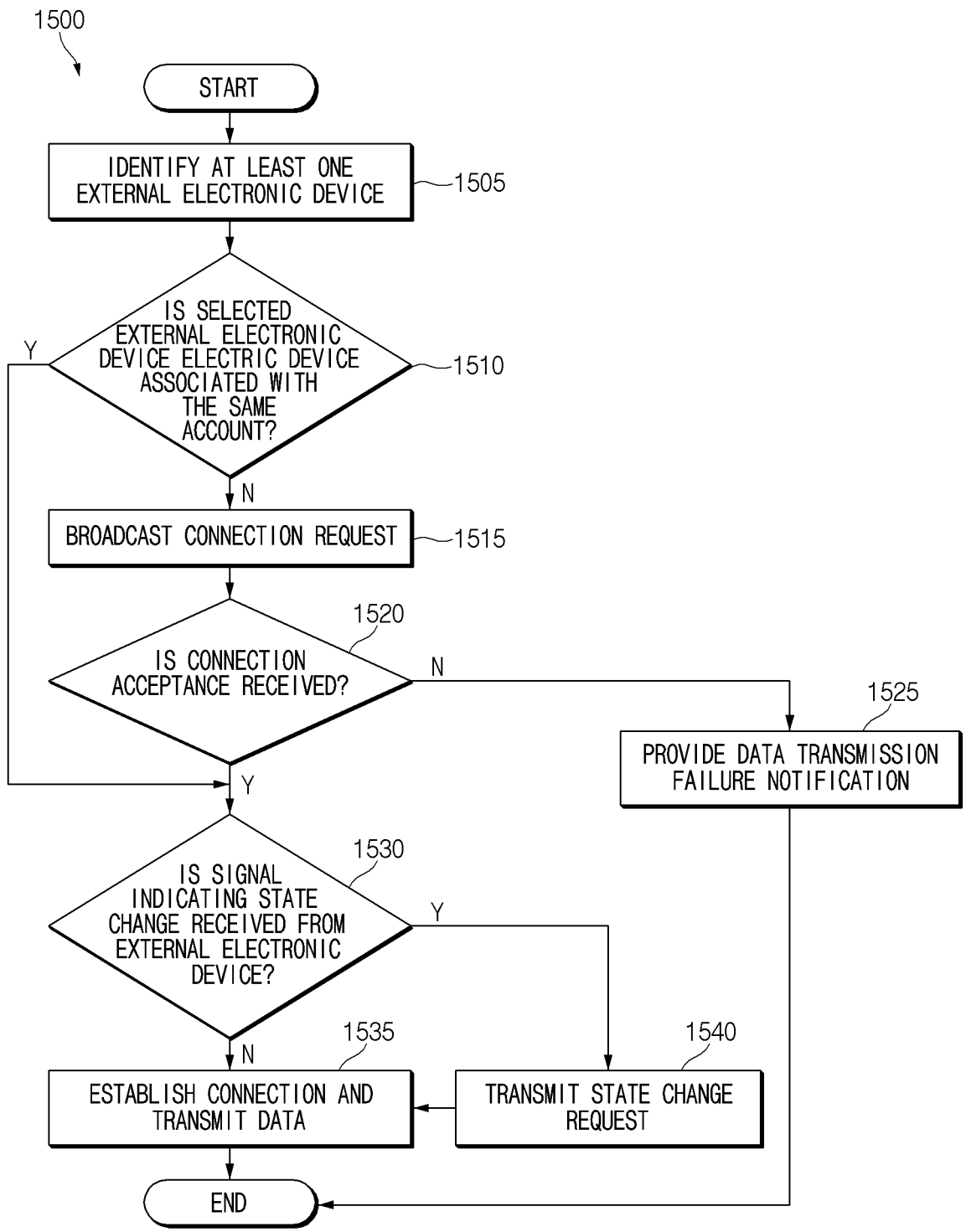
FIG. 15 is a flowchart of a method for transmitting data by an electronic device according to an embodiment of the disclosure.

FIG. 15 is a flowchart of a method for transmitting data by an electronic device according to an embodiment of the disclosure.

Referring to FIG. 15, in a method 1500, at operation 1505, an electronic device (e.g., the electronic device 201 of FIG. 2) may identify at least one external electronic device. For example, the electronic device 201 may identify at least one external electronic device by receiving advertising signals from at least one external electronic device by using a first communication circuit (the first communication circuit 281 of FIG. 2). For example, the electronic device 201 may identify at least one external electronic device by operation 320 of FIG. 3 or operation 405 of FIG. 4. In this case, the electronic device 201 may display information of the identified external electronic device on a display (e.g., the display 261 of FIG. 2). For example, the electronic device 201 may display information of the external electronic device identified in FIG. 7 or 16.

The electronic device 201 may receive an input to an external electronic device (e.g., an input indicating content sharing). For example, the electronic device 201 may identify the external electronic device selected for content sharing based on the user input for information of the identified external electronic device. In this case, in operation 1510, the electronic device 201 may determine whether the selected external electronic device (e.g., the external electronic device 202 of FIG. 2) is an electronic device associated with the same account as the electronic device 201. For example, the electronic device 201 may determine whether the external electronic device 202 selected based on information (e.g., contact information) stored in a memory (e.g., the memory 231 of FIG. 2) or information from the server is an electronic device associated with the same account as the electronic device 201.

If the selected external electronic device 202 is associated with an account different from the electronic device 201 (e.g., N in operation 1510), in operation 1515, the electronic device 201 may broadcast a connection request to the selected external electronic device 202. For example, the electronic device 201 may broadcast a connection request by operation 415 of FIG. 4. The electronic device 201 may broadcast the connection request to the selected external electronic device 202. In operation 1520, the electronic device 201 may determine whether connection acceptance is received from the external electronic device 202. For example, the external electronic device 202 may accept the connection based on setting information of the external electronic device 202 based on a user input of the external electronic device 202. Reception of connection acceptance may correspond to reception of the response signal of FIG. 4 (e.g., operation 420).

If the reception of connection acceptance fails (e.g., N in operation 1520), in operation 1525, the electronic device 201 may provide a data transmission failure notification. For example, the electronic device 201 may display information indicating that data transmission to the corresponding external electronic device 202 fails (e.g., the fifth icon 805 of FIG. 8) on the display 261.

According to an embodiment, the electronic device 201 may transmit data to a plurality of external electronic devices. For example, the electronic device 201 may receive an input for selecting a plurality of external electronic devices from among at least one external electronic device identified in operation 1505. The electronic device 201 may perform operations 1510 to 1525 on each of the plurality of selected external electronic devices.

If the connection acceptance is received (e.g., Y in operation 1520), in operation 1530, the electronic device 201 may determine whether a signal indicating the state change (e.g., the signal including the state change information) is received from the external electronic device 202. For example, the electronic device 201 may determine whether the signal indicating the state change is received before transmitting data to the external electronic device 202. If the electronic device 201 is configured to transmit data to the external electronic device 202 after transmitting data to another external electronic device, the electronic device 201 may perform operation 1530 after completing transmission of data to another external electronic device, or before transmitting data to the external electronic device 202.

According to an embodiment, if the external electronic device 202 is an electronic device associated with the same account as the electronic device 201 (e.g., Y in operation 1510), the electronic device 201 may perform operation 1530. For example, for the external electronic device 202 of the same account, the electronic device 201 may be configured not to perform a separate connection request procedure.

If a signal indicating the state change is received from the external electronic device 202 (e.g., Y in operation 1530), in operation 1540, the electronic device 201 may transmit a state change request to the external electronic device 202. For example, the electronic device 201 may transmit a state change request in a manner similar to operation 450 of FIG. 5. In operation 1535, after the state change request, the electronic device 201 may establish a connection with the external electronic device 202 and transmit data. If the signal indicating the state change is not received from the external electronic device 202 (e.g., N in operation 1530), in operation 1535, the electronic device 201 may establish a connection with the external electronic device 202 and transmit data.

According to an embodiment, if data is transmitted to a plurality of external electronic devices, the electronic device 201 may perform operations 1530 to 1540 for each of the plurality of external electronic devices. For example, the electronic device 201 may transmit data to a plurality of external electronic devices based on a specified transmission order, and may check an external electronic device that has transmitted a signal indicating a state change among the plurality of external electronic devices before transmitting the data. According to an embodiment, a method for data transmission of an electronic device 201 may include: identifying at least one external electronic device by using a first communication circuit (e.g., the first communication circuit 281 of FIG. 2) of the electronic device (e.g., operation 1505); receiving state change information indicating that a first external electronic device (e.g., the external electronic device 202 of FIG. 2) has transitioned from a first state to a second state before transmitting data to the first external electronic device (e.g., operation 1530), the first external electronic device being among the identified at least one external electronic device, the second state consuming less power than the first state; transmitting, to the first external electronic device, a state change request for causing the first external electronic device to transition to the first state based on the state change information (e.g., operation 1540); and transmitting the data to the first external electronic device by using a second communication circuit (e.g., the second communication circuit 291 of FIG. 2) of the electronic device, after transmitting the state change request. For example, the second communication circuit may support a wireless protocol different from the first communication circuit. For example, the first communication circuit may be configured to support communication based on a Bluetooth communication standard, and the second communication circuit may be configured to support communication based on a Wi-Fi communication standard.

For example, the method for data transmission may further include transmitting the data to a second external electronic device among the at least one external electronic device before transmitting the data to the first external electronic device. The transmitting of the data to the second external electronic device may include transmitting the data to the second external electronic device by using the second wireless communication circuit. The transmitting of the state change request to the first external electronic device may include transmitting the state change request to the first external electronic device based on whether the state change information is received, after completing transmission of the data to the second external electronic device. The transmitting of the data to the second external electronic device may include transmitting the data to the second external electronic device by using the second communication circuit, based on a wireless communication protocol for one-to-one communication, and the transmitting of the data to the first external electronic device may include transmitting the data to the first external electronic device by using the second communication circuit, based on the wireless communication protocol for one-to-one communication.

For example, the transmitting of the data to the second external electronic device may include transmitting the data to the second external electronic device by using the second communication circuit, based on a second wireless communication protocol. The transmitting of the data to the first external electronic device may include transmitting the data to the first external electronic device by using the second communication circuit, based on a third wireless communication protocol different from the second wireless communication protocol.

The transmitting of the state change request to the first external electronic device may include transmitting a broadcasting signal including the state change request by using the first communication circuit, and the broadcasting signal may include identification information of the first external electronic device.

The method for data transmission may further include displaying information on the at least one external electronic device on a display of the electronic device (e.g., the display 261 of FIG. 2) and displaying information indicating a state change of the first external electronic device on the display based on the reception of the state change information from the first external electronic device.

The identifying of the at least one external electronic device may include identifying the at least one external electronic device by receiving advertising signals from the at least one external electronic device by using the first communication circuit.

The method for data transmission may further include transmitting a connection request for data transmission to the first external electronic device by using the first communication circuit, based on identity of an account associated with the first external electronic device and an account associated with the electronic device.

Figure 16:
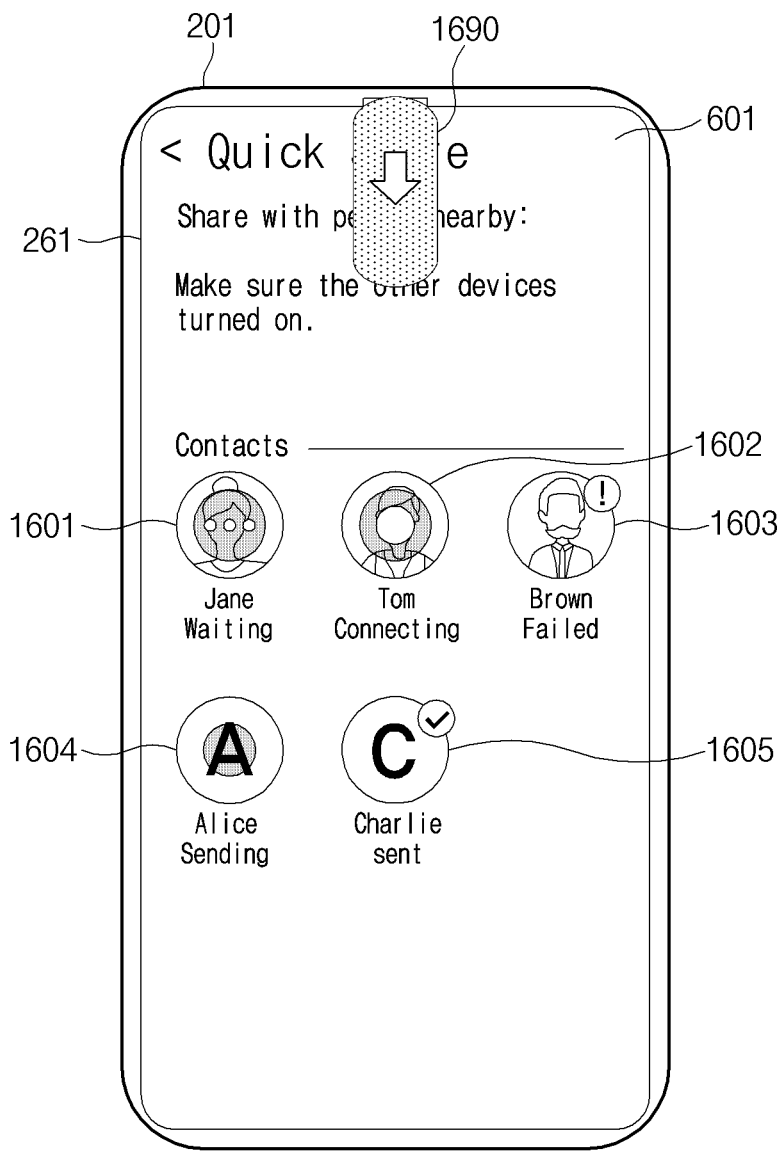
FIG. 16 illustrates a UI indicating a data sharing state according to an embodiment of the disclosure.

FIG. 16 illustrates a UI indicating a data sharing state according to an embodiment of the disclosure.

Referring to FIG. 16, the electronic device 201 may display the UI indicating a data sharing state on the display 261. The electronic device 201 may provide sharing state information by using an icon and text. For example, a first electronic device 1601 may be indicated as waiting, a second electronic device 1602 may be indicated as connecting, a third electronic device 1603 may be indicated as failure of date transmission, a fourth electronic device 1604 may be indicated as data being transmitted, and a fifth electronic device 1605 may be indicated as completion of data transmission.

If an input for activating a notification bar (e.g., a drag input 1690) is received, the electronic device 201 may display the UI of FIG. 17 on the display 261.

FIG. 17 illustrates a UI indicating a data sharing state according to an embodiment of the disclosure.

Referring to FIG. 17, with reference to reference numeral 1701, in response to an input for activating the notification bar of FIG. 16 (e.g., the drag input 1690), the electronic device 201 may display a notification bar including a data sharing state notification 1710. The sharing state notification 1710 may include brief information on data sharing (e.g., information on an external electronic device to be shared).

With reference to reference numeral 1702, if an input for the sharing state notification 1710 is received, the electronic device 201 may provide a specific sharing state. For example, the sharing state information of reference numeral 1701 may include more specific information than the UI indicating the sharing state of FIG. 16. For example, for the third electronic device 1603, the electronic device 201 may display, on the display 261, how many files have failed to be transmitted. For another example, for the fifth electronic device 1605, the electronic device 201 may display, on the display 261, how many files have been successfully transmitted.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first communication circuit;
a second communication circuit configured to support a wireless protocol different from the wireless protocol supported by the first communication circuit;
a display;
a processor operatively connected to the first communication circuit, the second communication circuit, and the display; and
a memory operatively connected to the processor,
wherein the memory stores one or more instructions that, when executed, cause the processor to:
identify at least one external electronic device by using the first communication circuit based on a request for transmitting data,
establish, using the first communication circuit, a first connection with a first external electronic device among the at least one external electronic device,
receive, using the first communication circuit, state change information from the first external electronic device through the first connection before transmitting the data to the first external electronic device, the state change information indicating that the first external electronic device has transitioned from a first state to a second state consuming less power than the first state,
transmit, to the first external electronic device, a state change request for causing the first external electronic device to transition to the first state based on receiving the state change information through the first connection,
establish, using the second communication circuit, a second connection with the first external electronic device after transmitting the state change request, and
transmit, through the second connection, the data to the first external electronic device by using the second communication circuit.

2. The electronic device of claim 1, wherein the one or more instructions, when executed, further cause the processor to transmit each of the data to the first external electronic device and a second external electronic device among the at least one external electronic device.

3. The electronic device of claim 2, wherein the one or more instructions, when executed, further cause the processor to:
transmit the data to the second external electronic device by using the second communication circuit,
receive the state change information while transmitting the data to the second external electronic device, and
transmit the state change request to the first external electronic device based on receiving the state change information, after completing transmission of the data to the second external electronic device.

4. The electronic device of claim 3, wherein the one or more instructions, when executed, further cause the processor to communicate with the first external electronic device and the second external electronic device by using the second communication circuit, based on a wireless communication protocol for one-to-one communication.

5. The electronic device of claim 3, wherein the one or more instructions, when executed, further cause the processor to:
transmit the data to the second external electronic device by using the second communication circuit, based on a second wireless communication protocol, and
transmit the data to the first external electronic device by using the second communication circuit, based on a third wireless communication protocol different from the second wireless communication protocol.

6. The electronic device of claim 1,
wherein the one or more instructions, when executed, further cause the processor to transmit a broadcasting signal including the state change request by using the first communication circuit, and
wherein the broadcasting signal comprises identification information of the first external electronic device.

7. The electronic device of claim 1, wherein the one or more instructions, when executed, further cause the processor to:
display, on the display, information on the at least one external electronic device, and
display, on the display, information indicating the state change of the first external electronic device, based on the reception of the state change information from the first external electronic device.

8. The electronic device of claim 1, wherein the one or more instructions, when executed, further cause the processor to identify the at least one external electronic device by receiving advertising signals from the at least one external electronic device by using the first communication circuit.

9. The electronic device of claim 1, wherein the one or more instructions, when executed, further cause the processor to:
transmit a connection request for data transmission to the first external electronic device by using the first communication circuit, based on identity of an account associated with the first external electronic device and an account associated with the electronic device.

10. The electronic device of claim 1,
wherein the first communication circuit is configured to support a communication protocol based on a Bluetooth communication standard, and
wherein the second communication circuit is configured to support a communication protocol based on a Wi-Fi communication standard.

11. A method for data transmission of an electronic device, the method comprising:
identifying at least one external electronic device by using a first communication circuit of the electronic device based on a request for transmitting data;
establishing, using the first communication circuit, a first connection with a first external electronic device among the at least one external electronic device;
receiving, using the first communication circuit, state change information from the first external electronic device through the first connection before transmitting the data to the first external electronic device, the state change information indicating that the first external electronic device has transitioned from a first state to a second state consuming less power than the first state;
receiving, using the first communication circuit, state change information from the first external electronic device through the first connection before transmitting the data to the first external electronic device, the state change information indicating that the first external electronic device has transitioned from a first state to a second state consuming less power than the first state;
transmitting, to the first external electronic device, a state change request for causing the first external electronic device to transition to the first state based on receiving the state change information;

establishing, using a second communication circuit of the electronic device, a second connection with the first external electronic device after transmitting the state change request; and transmitting, through the second connection, the data to the first external electronic device by using the second communication circuit of the electronic device, wherein the second communication circuit supports a wireless protocol different from the first communication circuit.

12. The method of claim 11, further comprising:

transmitting the data to a second external electronic device among the at least one external electronic device before transmitting the data to the first external electronic device.

13. The method of claim 12, wherein the transmitting of the data to the second external electronic device comprises transmitting the data to the second external electronic device by using the second communication circuit, and wherein the receiving the state change information from the first external electronic device comprises receiving the state change information while transmitting the data to the second external electronic device.

14. The method of claim 13, wherein the transmitting of the data to the second external electronic device comprises transmitting the data to the second external electronic device by using the second communication circuit, based on a wireless communication protocol for one-to-one communication, and wherein the transmitting of the data to the first external electronic device comprises transmitting the data to the first external electronic device by using the second communication circuit, based on the wireless communication protocol for one-to-one communication.

15. The method of claim 13, wherein the transmitting of the data to the second external electronic device comprises transmitting the data to the second external electronic device by using the second communication circuit, based on a second wireless communication protocol, and wherein the transmitting of the data to the first external electronic device comprises transmitting the data to the first external electronic device by using the second communication circuit, based on a third wireless communication protocol different from the second wireless communication protocol.

16. An electronic device comprising:

a first communication circuit;

a second communication circuit configured to support a wireless protocol different from the wireless protocol supported by the first communication circuit;

a processor operatively connected to the first communication circuit and the second communication circuit; and a memory operatively connected to the processor, wherein the memory stores one or more instructions that, when executed, cause the processor to:

broadcast information of the electronic device by using the first communication circuit, receive a connection request from an external electronic device by using the second communication circuit, transmit, to the external electronic device, a response signal for accepting the connection request by using the second communication circuit to establish a connection with the external electronic device, transit from a first state to a second state consuming less power than the first state before receiving data from the external electronic device over the connection, transmit, to the external electronic device, state change information indicating a transition to the second state by using the first communication circuit in response to the transition from the first state to the second state before receiving data from the external electronic device, receive, from the external electronic device, a state change request by using the first communication circuit, transit from the second state to the first state based on receiving the state change request, and receive, from the external electronic device, the data by using the second communication circuit.

17. The electronic device of claim 16, wherein the transition to the second state comprises a transition of the second communication circuit to a low power state.

18. The electronic device of claim 16, wherein the one or more instructions, when executed, further cause the processor to cause the electronic device to transition to the second state if the reception of the data is not started within a specified time after the transmission of the response signal.

* * * * *